(12) United States Patent
Uehara et al.

(10) Patent No.: US 10,901,141 B2
(45) Date of Patent: *Jan. 26, 2021

(54) DISPLAY DEVICE, LIGHTGUIDE PLATE, AND MANUFACTURING METHOD THEREOF

(71) Applicant: Japan Display Inc., Tokyo (JP)

(72) Inventors: Toshinori Uehara, Tokyo (JP); Hayato Kurasawa, Tokyo (JP); Masashi Mitsui, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/391,962

(22) Filed: Apr. 23, 2019

(65) Prior Publication Data

US 2019/0250325 A1 Aug. 15, 2019

Related U.S. Application Data

(63) Continuation of application No. 15/093,027, filed on Apr. 7, 2016, now Pat. No. 10,310,166.

(30) Foreign Application Priority Data

Apr. 10, 2015 (JP) ................................. 2015-081014

(51) Int. Cl.
*F21V 8/00* (2006.01)
(52) U.S. Cl.
CPC ......... *G02B 6/0061* (2013.01); *G02B 6/0036* (2013.01); *G02B 6/0055* (2013.01);
(Continued)
(58) Field of Classification Search
CPC ... G02B 6/0036; G02B 6/0038; G02B 6/0043
See application file for complete search history.

(56) References Cited

U.S. PATENT DOCUMENTS 7,733,439 B2 6/2010 Sampsell
8,705,915 B2 4/2014 Wang
(Continued)

FOREIGN PATENT DOCUMENTS

CN 101852362 A 10/2010
CN 104076554 A 10/2014
(Continued)

OTHER PUBLICATIONS

Taiwanese Office Action dated Jan. 13, 2017 for corresponding Taiwanese Patent Application No. 105109266.
(Continued)

*Primary Examiner* — Alexander K Garlen
*Assistant Examiner* — Colin J Cattanach
(74) *Attorney, Agent, or Firm* — Michael Best & Friedrich LLP

(57) ABSTRACT

According to one embodiment, a display device includes a display panel, a light source, a lightguide, and reflective elements. The lightguide includes a first end facing the light source, a first surface opposed to the display panel, and a second surface. The reflective elements are disposed inside the lightguide, the elements configured to reflect light passing through the first end to spread in the lightguide and to transmit the light through the first surface. Reflective elements are arranged to be apart from the first or second surface with a certain distance and has a reflective surface facing the first surface and projects toward the second surface, the reflective surface is inclined such that the light from the first end can be irradiated to the first surface.

20 Claims, 18 Drawing Sheets

(52) U.S. Cl.
CPC ............ *G02B 6/004* (2013.01); *G02B 6/0035* (2013.01); *G02B 6/0041* (2013.01); *G02B 6/0043* (2013.01); *G02B 6/0065* (2013.01)

(56) References Cited

U.S. PATENT DOCUMENTS

| | | | |
|---|---|---|---|
| 10,310,166 B2* | 6/2019 | Uehara | ................ G02B 6/0061 |
| 2003/0030764 A1 | 2/2003 | Lee | |
| 2004/0228112 A1 | 11/2004 | Takata | |
| 2008/0084600 A1 | 4/2008 | Bita | |
| 2008/0180956 A1 | 7/2008 | Gruhike | |
| 2009/0135469 A1 | 5/2009 | Lee | |
| 2009/0296193 A1 | 12/2009 | Bita | |
| 2010/0141557 A1 | 6/2010 | Gruhike | |
| 2010/0302616 A1* | 12/2010 | Bita | ..................... G02B 6/0036 359/291 |
| 2011/0157058 A1 | 6/2011 | Bita | |
| 2011/0205466 A1 | 8/2011 | Lee et al. | |
| 2012/0047715 A1 | 3/2012 | Chui | |
| 2012/0120682 A1 | 5/2012 | Sasagawa | |
| 2012/0274867 A1 | 11/2012 | Shinkai | |
| 2013/0063968 A1 | 3/2013 | Neugebauer | |
| 2013/0100144 A1 | 4/2013 | Rao et al. | |
| 2013/0100382 A1 | 4/2013 | Chang | |
| 2013/0127784 A1 | 5/2013 | Martin | |
| 2013/0176317 A1 | 7/2013 | Li et al. | |
| 2013/0188392 A1 | 7/2013 | Yoon et al. | |
| 2013/0336005 A1 | 12/2013 | Chen | |
| 2014/0146563 A1 | 5/2014 | Watanabe | |
| 2015/0234113 A1* | 8/2015 | Nakashima | .......... G02B 6/0036 362/611 |

FOREIGN PATENT DOCUMENTS

| | | |
|---|---|---|
| JP | 2002-14342 A | 1/2002 |
| JP | 2003-187620 A | 7/2003 |
| JP | 2003-242814 A | 8/2003 |
| JP | 2003-257227 A | 9/2003 |
| JP | 2007-141867 A | 6/2007 |
| JP | 2012-528360 A | 11/2012 |
| JP | 2013-516024 A | 5/2013 |
| JP | 2013-127961 A | 6/2013 |
| JP | 2014-503939 A | 2/2014 |
| JP | 2014-191228 A | 10/2014 |
| JP | 2014-203004 A | 10/2014 |
| TW | 201111707 A1 | 4/2011 |
| WO | 2013/184385 A1 | 12/2013 |

OTHER PUBLICATIONS

Office Action from Korean Patent Office dated Jan. 2, 2018, for application No. 10-2016-0041568.

Office Action from Japan Patent Office dated Jun. 19, 2018, for application No. JP2015-081014.

Chinese Office Action dated Sep. 30, 2018 for application No. CN 201610218024.

Japanese Office Action dated Oct. 1, 2019 for corresponding Japanese Patent Application No. 2018-237583.

* cited by examiner

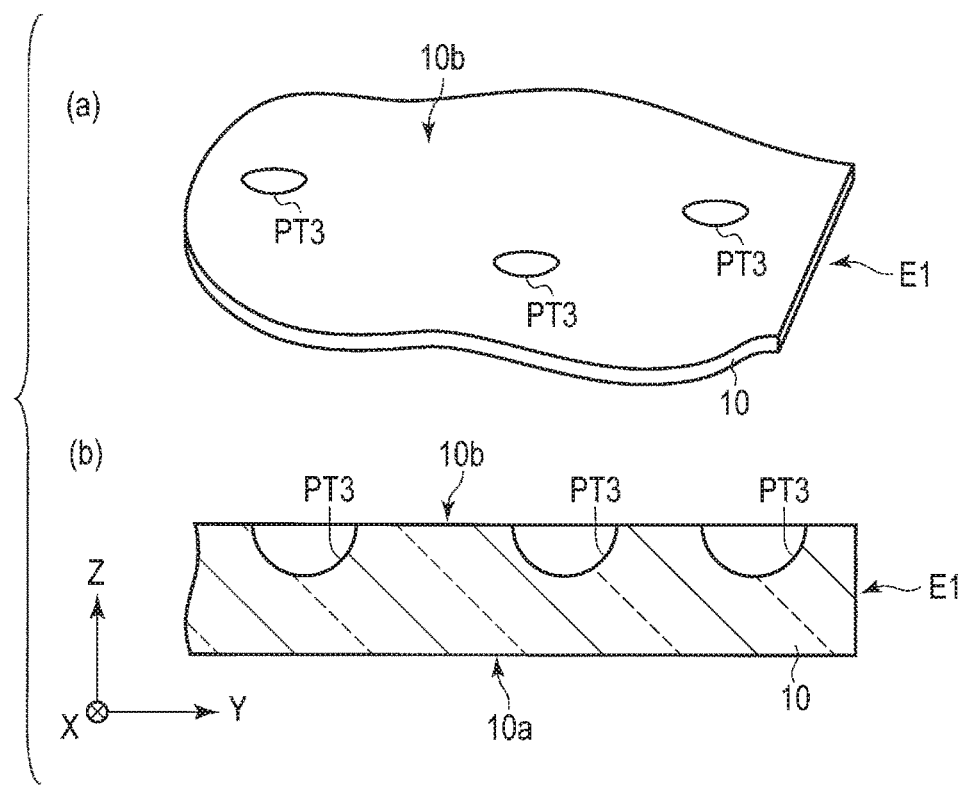
F I G. 15
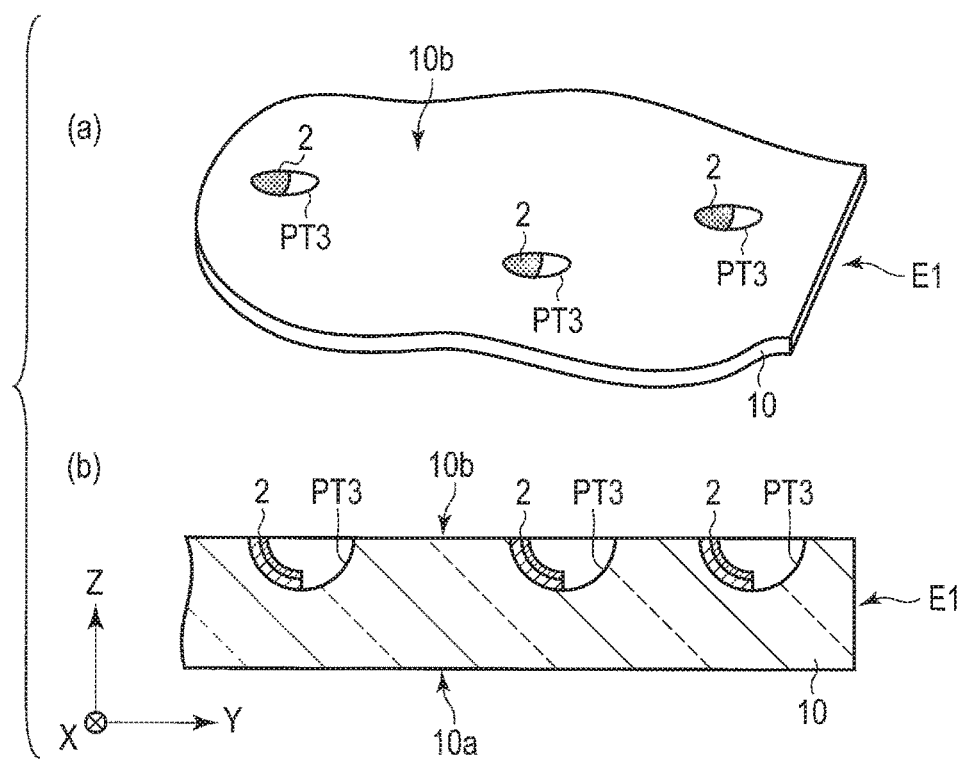
F I G. 16

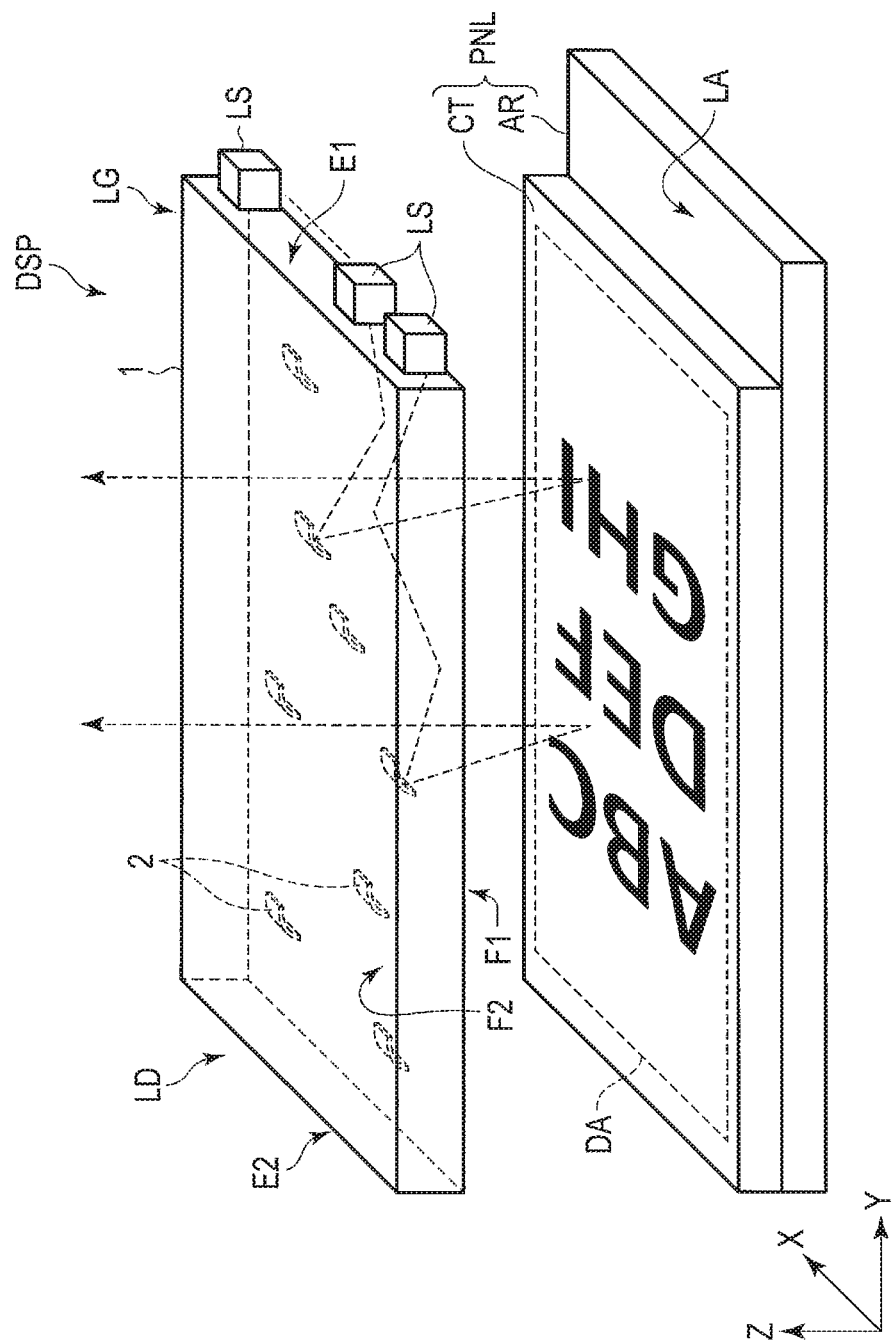
F I G. 23

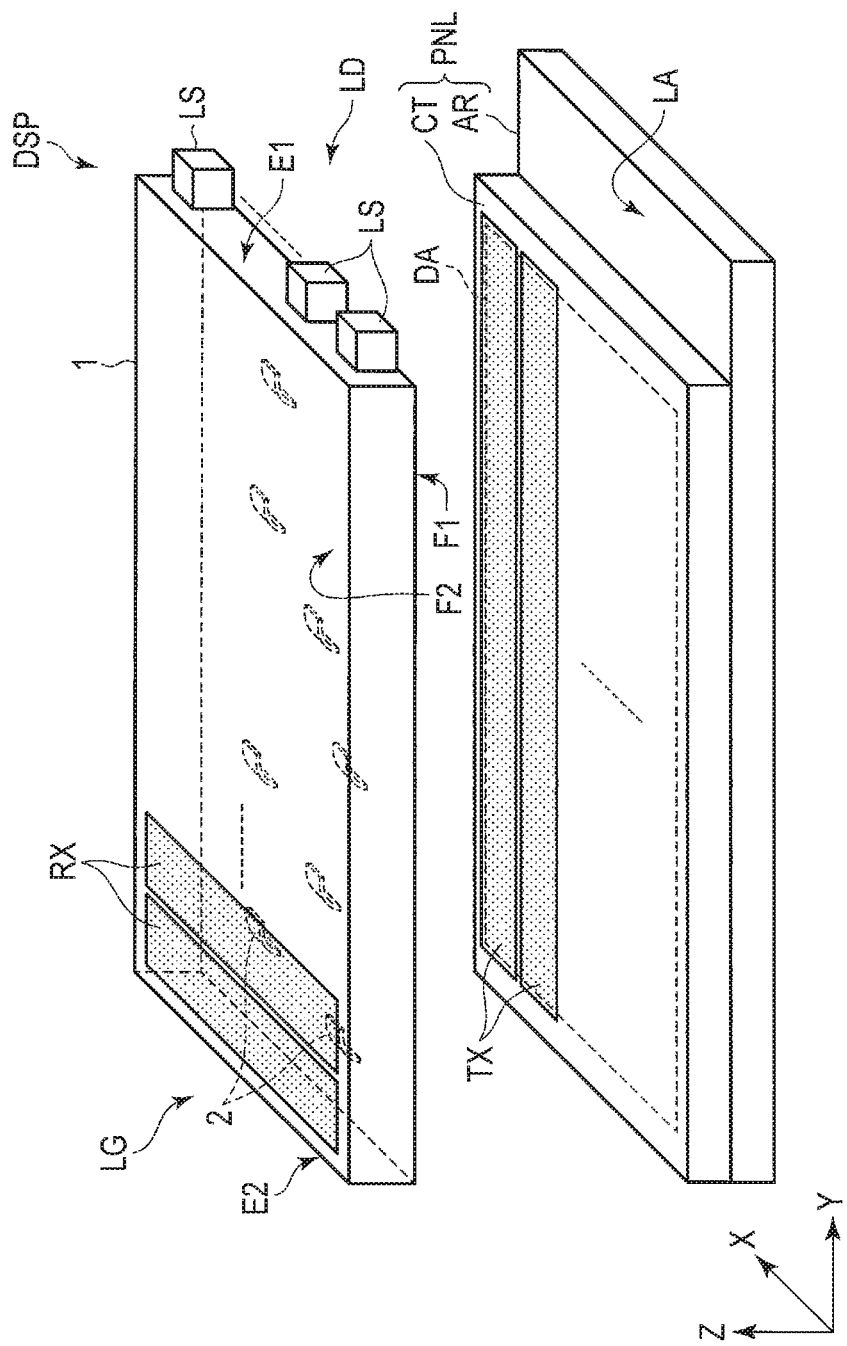
F I G. 25

US 10,901,141 B2

DISPLAY DEVICE, LIGHTGUIDE PLATE, AND MANUFACTURING METHOD THEREOF

CROSS-REFERENCE TO RELATED APPLICATIONS

This application is a Continuation of application Ser. No. 15/093,027, filed Apr. 7, 2016, and is based upon and claims the benefit of priority from Japanese Patent Application No. 2015-081014, filed Apr. 10, 2015, the entire contents of which are incorporated herein by reference.

FIELD

Embodiments described herein relate generally to a display device, a lightguide plate, and a manufacturing method thereof.

BACKGROUND

Reflective display devices which display an image by controlling the reflection of external light have advantages such as less power consumption as compared to transmissive display devices including a backlight unit.

Some reflective display devices include a surface emission illumination device in the display surface side of the display panel. The illumination device includes, for example, a light source and a lightguide plate which receives light from the light source and transmits the light through a surface opposed to the display panel. With the illumination device, auxiliary light for image display can be produced and the visibility of image can be increased. The illumination device is often referred to as a frontlight.

The illumination device as above transmits the light spreading in the lightguide plate within a suitable range of angles. Thus, the light can be used more efficiently and the visibility of the display device can be improved.

BRIEF DESCRIPTION OF THE DRAWINGS

FIG. 15 shows an example of a manufacturing method of a lightguide plate of a third embodiment.

FIG. 16 shows the example of the manufacturing method of the lightguide plate of the third embodiment.

FIG. 23 is a schematic perspective view of a display device of a fifth embodiment.

FIG. 25 is a schematic perspective view of a display device of a sixth embodiment.

DETAILED DESCRIPTION

Figure 1:
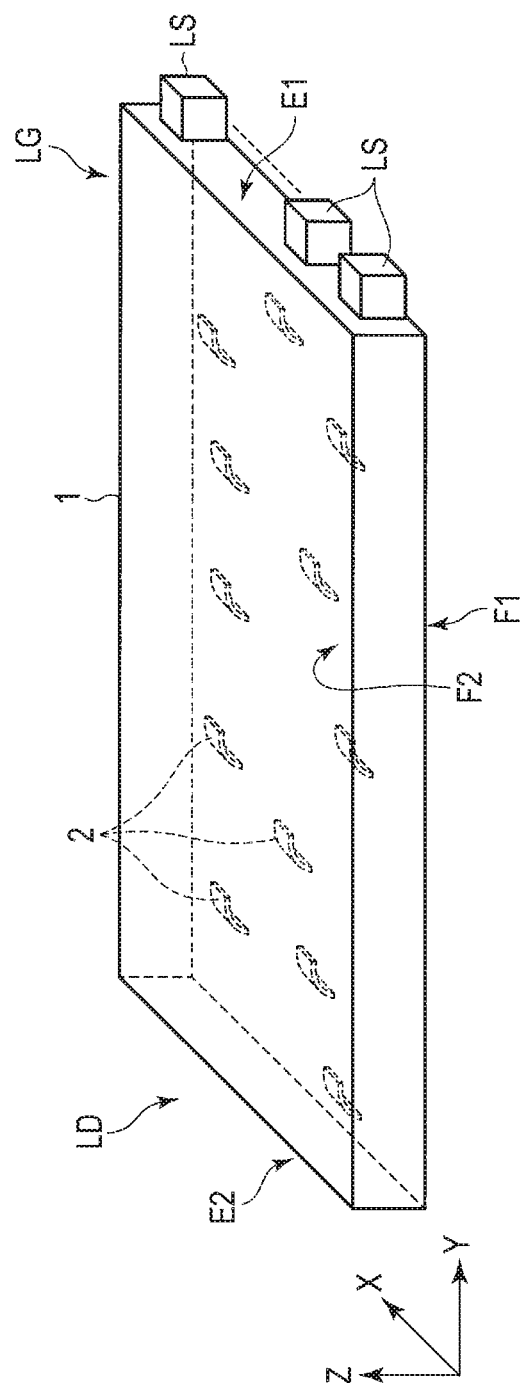
FIG. 1 is a perspective view which shows a schematic structure of an illumination device of a first embodiment.

In general, according to one embodiment, a display device includes a display panel, light source, lightguide member, and a plurality of reflective elements. The display panel includes a display area on which an image is displayed. The lightguide member includes a first end which faces the light source, second end which is opposite to the first end, first main surface which is arranged along the first and second ends to be opposed to the display panel, and second main surface which is opposite to the first main surface and arranged along the first and second ends. The reflective elements are disposed inside the lightguide member, and the reflective elements reflect light passing through the first end to spread in the lightguide member, and transmit the light through the first main surface. Furthermore, each of the reflective elements is arranged to be apart from the first main surface or the second main surface with a certain distance in a thickness direction of the lightguide member and has a curved reflective surface which faces the first main surface and projects toward the second main surface, the curved reflective surface is inclined such that the light from the first end can be irradiated to the first main surface.

Furthermore, according to an embodiment, an illumination device includes the above light source, the above lightguide member, and the above reflective elements. Furthermore, according to an embodiment, a lightguide plate includes the above lightguide member, and the above reflective elements.

Furthermore, according to an embodiment, a manufacturing method of a lightguide plate includes forming a plurality of projecting patterns each having a curved surface on a main surface of a base material, forming a plurality of reflective elements at least partly covering the projecting patterns, and forming an overcoat layer formed of a material having a refractive index substantially same as that of the projecting pattern, the overcoat layer formed on the main surface of the base material to cover the reflective elements.

Embodiments will be described with reference to the accompanying drawings.

Note that the embodiments described hereinafter are merely examples, and any other embodiments which are conceivable by a person having ordinary skill in the art without departing from the substantial concept of the invention are encompassed in the scope of the invention of the present application. Furthermore, the drawings are presented such that a dimension and a shape of each component are drawn more schematically as compared to the actual model for the sake of clear explanation. However, such depiction is merely an example and interpretation of the present invention is not limited thereby. In each figure, if elements are arranged continuously, the reference number of those which are the same as or similar to the one already depicted will be omitted. Furthermore, in the description and the figures, structural elements which function the same as or similarly to the one already described or depicted in the preceding will be referred to by the same reference numbers and descriptions considered redundant will be omitted.

First Embodiment

In the first embodiment, an example of an illumination device and a lightguide plate will be explained. The illumination device may be used as a frontlight of a display device such as a liquid crystal display device, micro-electro mechanical systems (MEMS) applied display device, and electronic paper display device using electrophoresis or the like.

FIG. 1 is a perspective view which shows a schematic structure of an illumination device LD of the present embodiment. The illumination device LD includes a lightguide plate LG and a light source LS. The lightguide plate LG includes a plate-like lightguide member 1 having a predetermined thickness and a plurality of reflective elements 2 (first reflective elements) disposed inside the lightguide member 1.

The lightguide member 1 includes a first end E1, second end E2 which is opposite to the first end E1, first main surface F1 reaching the first end E1 and the second end E2, and second main surface F2 reaching the first end E1 and the second end E2 at the opposite side of the first main surface F1. The first end E1 and the second end E2 are parallel with a first direction X, and correspond to side surfaces connecting the first main surface F1 and the second main surface F2.

In the example of FIG. 1, the first main surface F1 and the second main surface F2 of the lightguide member 1 have a rectangular shape. The first end E1 and the second end E2 are side surfaces connecting the corresponding short sides of the first main surface F1 and the second main surface F2. The long sides of the first main surface F1 and the second main surface F2 extend along the second direction Y which is orthogonal to the first direction X. The thickness direction of the lightguide member 1 is defined as the third direction Z. The third direction Z crosses the first direction X and the second direction Y, and for example, the third direction Z is orthogonal to the first direction X and the second direction Y. Each of the first main surface F1 and the second main surface F2 is parallel with an XY plane which is defined by the first direction X and the second direction Y. The shape of the lightguide member 1 is not limited to the above described shape, and the first end E1 and the second end E2 may connect the long sides of the rectangular first main surface F1 and second main surface F2, or the first main surface F1 and the second main surface F2 may have a square shape or other shapes.

The thickness of the lightguide member 1 may be less than that of the light source LS. In that case, the lightguide member 1 may include a main lightguide which is formed thinner than the light source LS in the third direction Z and a light receiver disposed between the main lightguide and the light source LS. For example, in the main lightguide, the first main surface F1 and the second main surface F2 are parallel. The main lightguide and the light receiver may be integrally formed using the same material, or may be formed separately and then connected together. The side surface of the light receiver which opposed to the light source LS corresponds to the first end E1. The thickness of the light receiver in the third direction Z increases from the main lightguide to the first end E1. For example, the reflective elements 2 are disposed on the main lightguide but not on the light receiver. Since the first end E1 has wide width in the third direction Z, light from the light source LS suitably enters the light receiver. Furthermore, with the lightguide member 1 structured as above, the main lightguide can be formed thin.

The light source LS faces the first end E1. The light source LS may be a luminescent diode or an organic electroluminescence device. In the example of FIG. 1, three or more light sources LS are arranged along the first end E1; however, the number thereof may be two or one. The light source LS may be linear to be arranged along the first end E1.

Figure 2:
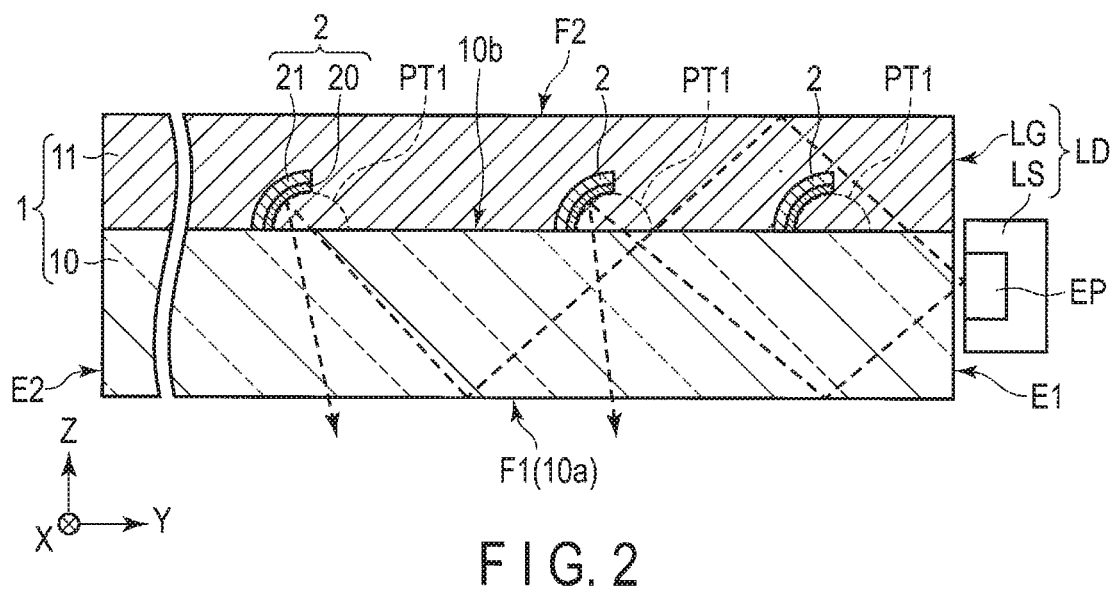
FIG. 2 is a schematic cross-sectional view which shows the illumination device of the first embodiment.

FIG. 2 is a schematic cross-sectional view of the illumination device LD in the Y-Z plane defined by the second direction Y and the third direction Z. The lightguide member 1 includes a transparent base material 10 having a first main surface 10a and a second main surface 10b which is opposite to the first main surface 10a and an overcoat layer 11 which is provided with the second main surface 10b of the transparent base material 10. The transparent base material 10 and the overcoat layer 11 both possess high light transmissivity. The transparent base material 10 may be formed of glass or a resin material, for example. The overcoat layer 11 may be formed of a resin material, for example. The lightguide member 1 may include an additional layer other than the transparent base material 10 and the overcoat layer 11. FIG. 2 schematically shows the thickness of the transparent base material 10 and the overcoat layer 11, and the transparent base material 10 may be made thicker in the actual use. As an example, the transparent base material 10 may have a thickness of 0.5 mm and the overcoat layer 11 may have a thickness of several to a few tens of micrometers.

In the example of FIG. 2, the first end E1 and second end E2 include ends of the transparent base material 10 and the overcoat layer 11. Furthermore, the first main surface F1 of the lightguide member 1 corresponds to the first main surface 10a of the transparent base material 10 and the second main surface F2 of the lightguide member 1 corresponds to the outer surface of the overcoat layer 11 (the surface of the overcoat layer 11 which does not contact the transparent base material 10).

The reflective elements 2 are, for example, each formed in the same shape and arranged inside the overcoat layer 11 along with the second main surface 10b of the transparent base material 10. In the present embodiment, each reflective element 2 is formed in a curved half dome-like shape projecting toward the second main surface F2, in other words, a curved and a partly removed bowl-like shape projecting toward the second main surface F2 (a half of the bowl at the first end E1 side is removed in this example).

Each reflective element 2 includes a high-reflectivity layer 20 which suitably reflects light spreading in the lightguide member 1 and a low-reflectivity layer 21 (or light shielding layer) the reflectivity of which is lower than that of the high-reflectivity layer 20. The high-reflectivity layer 20 may be formed of a metal material such as aluminum or silver. The low-reflectivity layer 21 may be formed of a metal material or a metal oxide film of which reflectivity is relatively low.

The high-reflectivity layer 20 covers a part of a projecting pattern PT1 arranged on the second main surface 10b of the transparent base material 10. Projecting pattern PT1 is, for example, half spherical or partial spherical. Note that, in each embodiment, the term half spherical and the term partial spherical mean not only a part of a sphere but also a part of a sphere-like shape such as an ellipse. The low-reflectivity layer 21 covers the surface of the high-reflectivity layer 20 in the second main surface F2 side. The overcoat layer 11 covers the reflective elements 2, projecting patterns PT1 uncovered by the reflective elements 2, and the second main surface 10b of the transparent base material 10. Projecting pattern PT1 and the overcoat layer 11 can be formed such that their refractive indices become substantially the same, that is, they may be formed of the same material. Thus, in the boundary between each projecting pattern PT1 and the overcoat layer 11, light going from projecting pattern PT1 to the overcoat layer 11 and light going oppositely hardly make refraction or reflection. Thus, no adversely optical effect occurs. The light linearity is maintained regardless of the boundary between projecting pattern PT1 and the overcoat layer 11. If projecting pattern PT1 and the overcoat layer 11 are formed of the same material, they are substantially integral and the boundary therebetween is almost invisible.

In the example of FIG. 2, the transparent base material 10 and the overcoat layer 11 have a substantially same thickness from the first end E1 to the second end E2. Therefore, each reflective element 2 is arranged to be apart from the first main surface F1 and the second main surface F2 with a certain distance in the thickness direction of the lightguide member 1 (in third direction Z).

A light emitter EP of the light source LS faces the first end E1 (an end of the transparent base material 10). In FIG. 2, an example of a passage of the light from the light emitter EP is depicted by dotted lines. The light from the light emitter EP enters the lightguide member 1 through the first end E1 spreads toward the second end E2 while being totally reflected by the first main surface F1 and the second main surface F2. However, part of the light is loosed from the total reflection by the first main surface F1 when being reflected by the high-reflectivity layer 20 (reflective surface 20a which will be described later) of the reflective element 2, and passes outside through the first main surface F1.

Figure 3:
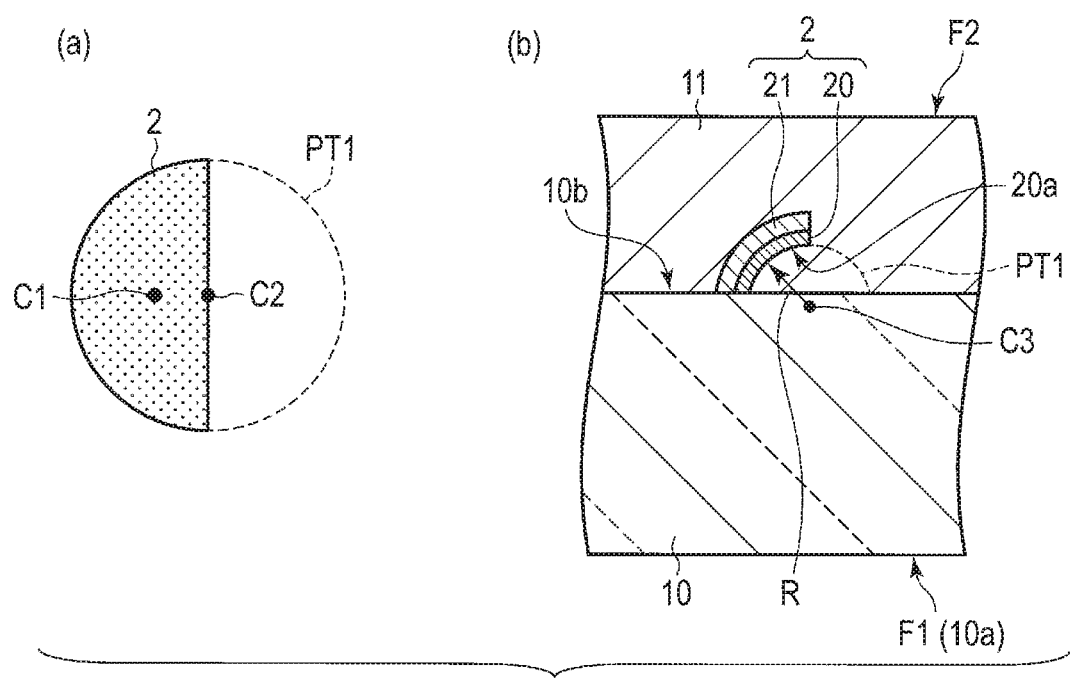
FIG. 3 is a schematic view which shows a reflective element of the illumination device of the first embodiment.

In FIG. 3, an example of the shape of the reflective element 2 is schematically shown. FIG. 3(a) shows the reflective element 2 and projecting pattern PT1 in an X-Y plan view. FIG. 3(b) shows the structure including reflective element 2, projecting pattern PT1, and the like in a cross-sectional view of the Y-Z plane. As in FIGS. 3(a) and 3(b), the reflective element 2 covers the half of the surface of projecting pattern PT1 in the second end E2 side (the left half of the figure), that is, the other half of the surface of projecting pattern PT1 in the first end E1 (the right half of the figure) is uncovered. In this state, the barycenter C1 of the reflective element 2 and the barycenter C2 of projecting pattern PT1 are shifted in the X-Y plane. The barycenter C1 is more distant from the light source LS than is the barycenter C2 (is farther left than the barycenter C2 in the figure).

From a different standpoint, the reflective element 2 is, in a three-dimensional view, shaped to be asymmetrical with respect to an axis parallel to the normal of the first main surface F1 or the second main surface F2 (the third direction Z). For example, the shape of the reflective element 2 is rotationally asymmetrical with respect to the axis extending in the third direction Z passing through the barycenter C1 or C2.

The surface of the high-reflectivity layer 20 in the first main surface F1 side is a reflective surface 20a along the surface of projecting pattern PT1. The reflective surface 20a faces the first main surface F1 side and the light source LS side (the right side of the figure), and projects curving toward the second main surface F2. The reflective element 2 is thus arranged such that the reflective surface 20a is inclined to irradiate the light from the first end E1 to the first main surface F1. In the present embodiment, the center of curvature C3 of the reflective surface 20a is at a position closer to the first main surface F1 than is the center of the reflective surface 20a in the third direction Z. In the example of FIG. 3(b), the reflective surface 20a is a surface of the radius of curvature R of which center is a single center of curvature C3; however, if there are centers of curvature of the reflective surface 20a varying at different positions, the reflective surface 20a is arranged such that most or all centers of curvatures can be positioned to be closer to the first main surface F1 than are the corresponding parts of the reflective surface 20a.

The reflective element 2 having the reflective surface 20a formed as above can control the angle of the light reflected by the reflective surface 20a and passing outside through the first main surface F1 to be within a specific range. That is, the angle of light passing outside through the first main surface F1 can be set within a range narrower compared to a case where the reflective surface 20a is flat and a case where the reflective surface 20a is curved but positioned such that its center of curvature C3 is set closer to the second main surface F2.

Furthermore, since the barycenter C1 of the reflective element 2 and the barycenter C2 of projecting pattern PT1 are shifted on the X-Y plane, the reflective element 2 can apply anisotropy to the angle of light passing outside through the first main surface F1. For example, in the example of FIGS. 2 and 3, the reflective element 2 can control the angle of light passing outside through the first main surface F1 to be inclined to the first end E1 side.

Figure 4:
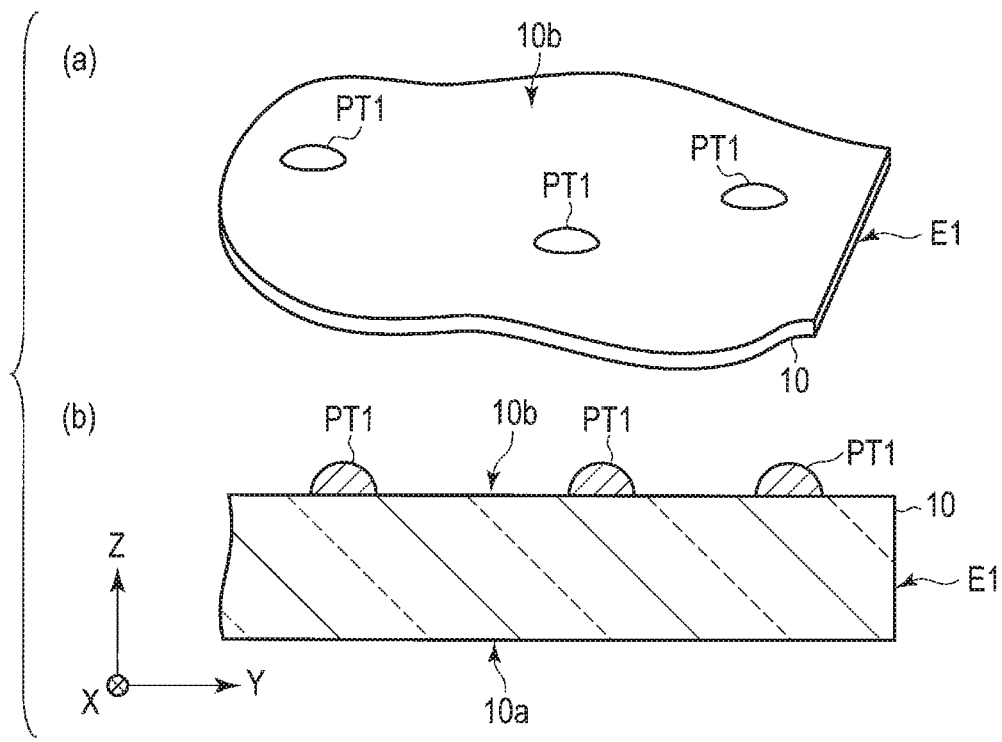
FIG. 4 shows an example of a manufacturing method of a lightguide plate of the first embodiment.
Figure 5:
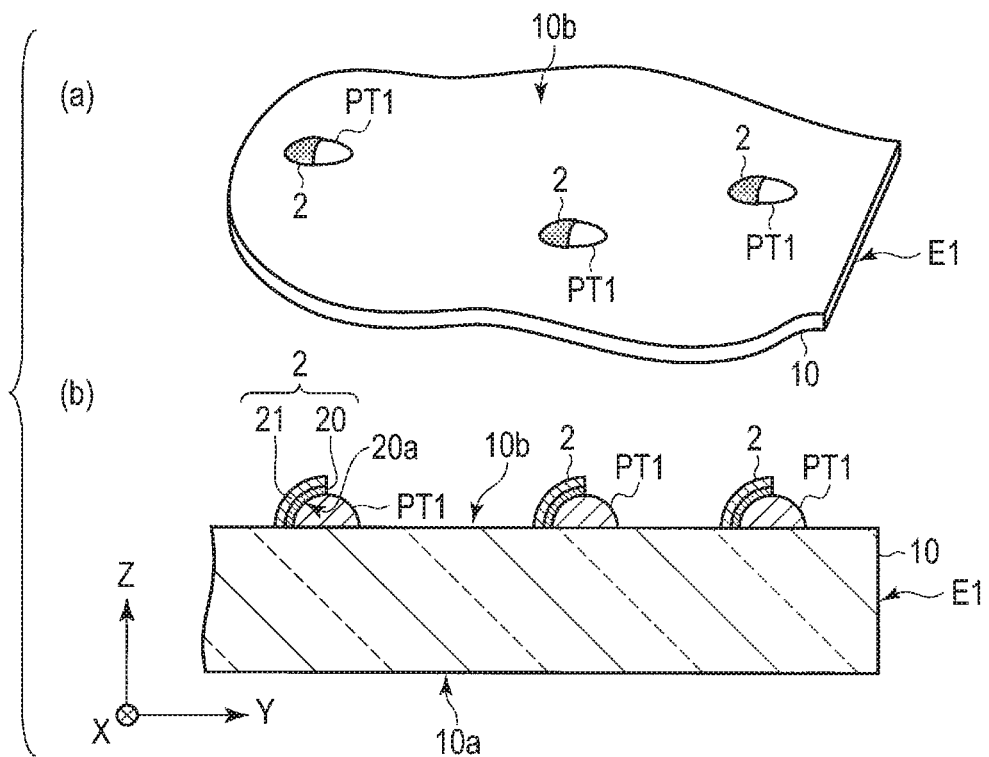
FIG. 5 shows the example of the manufacturing method of the lightguide plate of the first embodiment.
Figure 6:
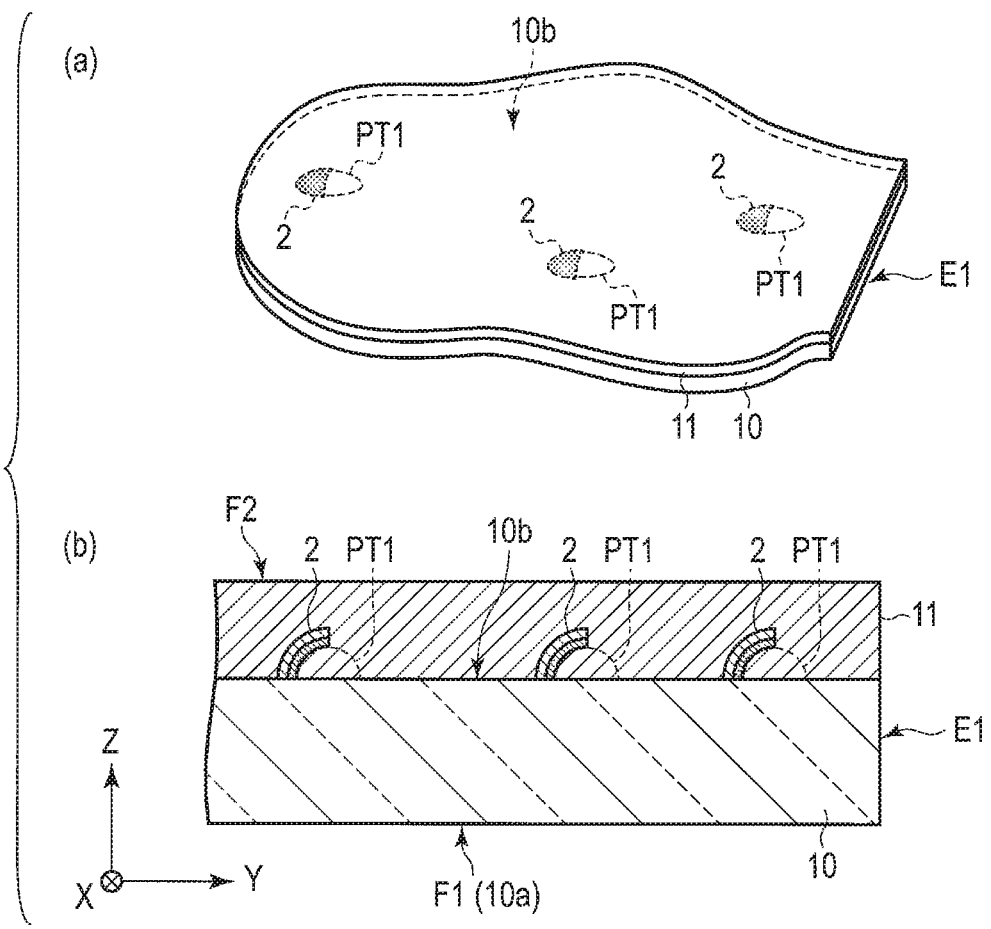
FIG. 6 shows the example of the manufacturing method of the lightguide plate of the first embodiment.

An example of a manufacturing method of a lightguide plate LG will be explained with reference to FIGS. 4 to 6. In each figure, item (a) is a partial perspective view of the lightguide plate LG during the manufacturing process, and item (b) is a partial cross-sectional view of the lightguide plate LG in the Y-Z plane.

Initially, as in FIGS. 4(a) and 4(b), a plurality of projecting patterns PT1 are formed on the second main surface 10b of the transparent base material 10. Projecting patterns PT1 are formed through, for example, a photolithography process. Here, projecting patterns PT1 after development may be heated such that they are at least partially melted to round the corners. Projecting patterns PT1 can be finished to have a spherical surface as shown in FIG. 4(b). Note that the formation process of projecting patterns PT1 is not limited to the photolithography process, and may be an inkjet printing process or the like. Projecting patterns PT1 may be arranged regularly or randomly.

Then, as in FIGS. 5(a) and 5(b), a plurality of reflective elements 2 which at least partially cover projecting patterns PT1 are prepared. In this process, for example, the high-reflectivity layer 20 and the low-reflectivity layer 21 are formed in this order on the second main surface 10b of the transparent base material 10 with projecting patterns PT1 formed thereon. Here, the high-reflectivity layer 20 and the low-reflectivity layer 21 are formed through an evaporation or sputtering process, and then patterned by etching to form the reflective elements 2 shown in FIGS. 5(a) and 5(b). Then, as in FIGS. 6(a) and 6(b), the overcoat layer 11 is formed on the second main surface 10b of the transparent base material 10 to cover the reflective elements 2 and projecting patterns PT1. The lightguide plate LG is manufactured as above.

Then, an example of the shape of the reflective surface 20a of the high-reflectivity layer 20 will be explained. In a cross-sectional view of the lightguide member 1 taken along the direction from the first end E1 to the second end E2 (cross-section along the Y-Z plane), the reflective surface 20a is formed such that an angle formed by the reflective surface 20a and the first main surface F1 or an imaginary surface parallel with the first main surface F1 can be set within a certain distribution of angle of inclination. If the illumination device LD is used as a frontlight of a reflective display device of a device such as a smartphone or a tablet as in the fifth embodiment which is described later, the distribution of angle of inclination is set such that the peak of the angle falls between 10 and 50°, preferably between 30 and 45°, and more preferably between 37 and 43° to improve the visibility of the display image.

Figure 7:
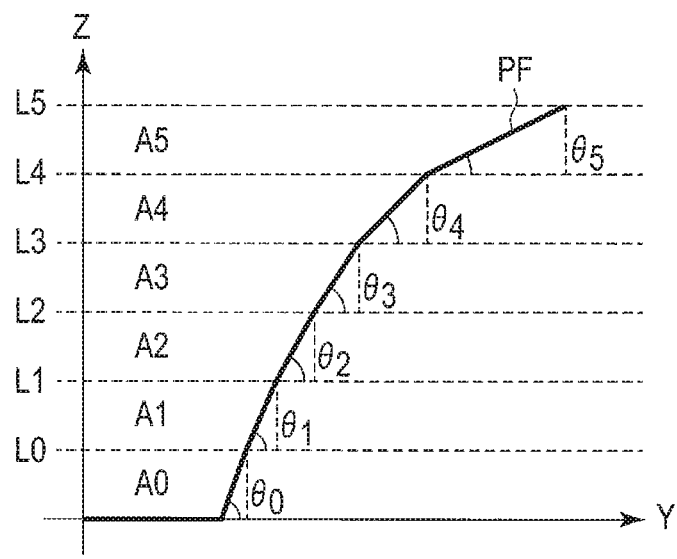
FIG. 7 is a schematic view of a profile of a reflective surface of a reflective element.
Figure 8:
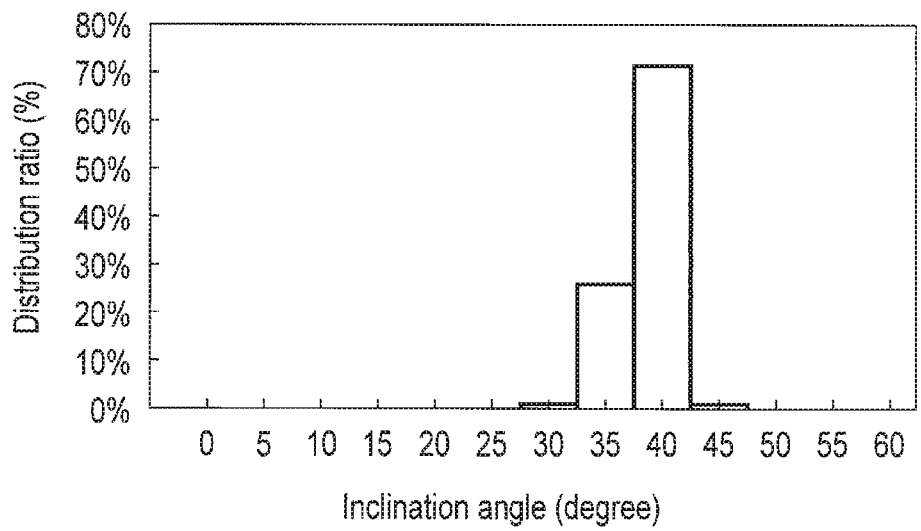
FIG. 8 is a graph of the profile of the reflective element.

The distribution of angle of inclination and measurement method of the angle peak of the reflective surface 20a will be described with reference to FIGS. 7 and 8. In the measurement process, a profile of the reflective surface 20a is initially measured. FIG. 7 schematically shows a profile PF of the reflective surface 20a in the Y-Z plane. The profile PF corresponds to the shape of the reflective surface 20a in the Y-Z plane passing the barycenter of the reflective element 2, for example.

To measure the distribution of angle of inclination, the profile PF is divided into a plurality of areas at regular intervals in the third direction Z. In the example of FIG. 7, the profile PF is divided into six areas A0 to A5 using lines L0 to L5 arranged along the third direction Z at regular intervals.

Angles θ0 to θ5 of the profile PF in respective areas A0 to A5 are measured to obtain the distribution of angle of inclination. For example, inclination of the profile PF between the first main surface F1 (the lower side of the figure) and a contact point with line L0 with respect to the axis Y is angle θ0.
Furthermore, inclination of the profile PF between the contact point with line L0 and a contact point with line L1 with respect to the axis Y is angle θ1. Angles θ2 to θ5 can be measured in the same manner.

Note that the profile PF is divided into six areas of A0 to A5 in FIG. 7 for the sake of simplification; however, ten or more areas should be provided in the actual measurement of angles. The graph of FIG. 8 shows an example of distribution of angle of inclination measured as above. In this graph, the horizontal axis shows angle (degree) and the vertical axis shows distribution ratio (%). The distribution of angle of inclination is depicted by bars where a unit of a bar is five degrees. The distribution ratio is percentage of the length corresponding to the angles of the horizontal axis of the entire length of the profile PF. The angle of each divided area is assumed to be constant in each area. In the distribution of angle of inclination of FIG. 8, angles are focused around 40 degrees. The graph shows than the above-mentioned angle range between 37 and 43° is satisfied.

Now, an example of the arrangement of reflective elements 2 of the lightguide member 1 will be explained.

Figure 9:
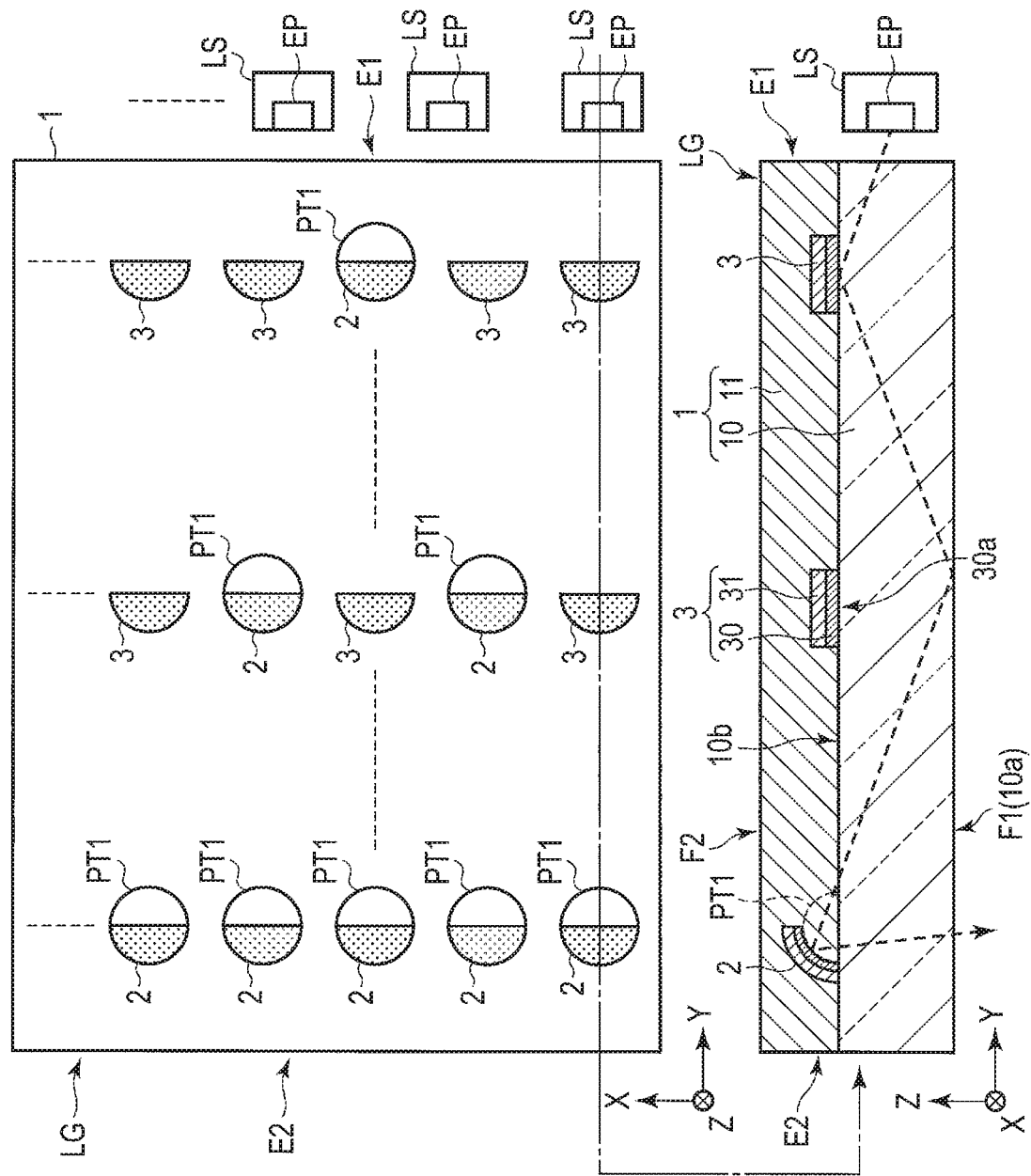
FIG. 9 is a schematic view of an example of the arrangement of the reflective elements.

FIG. 9 shows an example of the arrangement of the reflective elements 2 in which the arrangement of the reflective elements 2 in the lightguide member 1 in the X-Y plane is the upper figure and a cross-sectional view thereof in the Y-Z plane is the lower figure. The reflective elements 2 are arranged in the X-Y plane in such a manner that the density thereof increases from the first end E1 to the second end E2. In other words, the number of the reflective elements 2 per unit area increases from the first end E1 to the second end E2. Furthermore, in the example of FIG. 9, the lightguide plate LG includes a plurality of dummy reflective elements 3 (second reflective elements) inside the lightguide member 1. The dummy reflective elements 3 are arranged in the X-Y plane in such a manner that the density thereof decreases from the first end E1 to the second end E2. In other words, the number of the dummy reflective elements 3 per unit area decreases from the first end E1 to the second end E2. For example, the density of the reflective elements 2 and the dummy reflective elements 3 on the X-Y plane is substantially uniform.

The dummy reflective element 3 includes, as in the reflective element 2, a high-reflectivity layer 30 arranged in the first main surface F1 side and a low-reflectivity layer 31 covering the high-reflectivity layer 30. The reflective elements 3 are formed directly on the second main surface 10b of the transparent base material 10 without projecting patterns PT1 interposed therebetween. Therefore, a reflective surface 30a of the high-reflectivity layer 30 faces the first main surface F1 and is substantially flat. The dummy reflective elements 3 can be formed through the same manufacturing process as that of the reflective elements 2. The outer shape of the dummy reflective element 3 is the same as that of the reflective element 2 in the plan view with respect to the third direction Z. Light from the light source LS enters the first end E1 and part of the light is totally internally reflected on reaching the reflective surface 30a of the dummy reflective element 3. Since the reflective surface 30a is flat, the reflected light cannot acquire an angle that allows it to pass through the first main surface F1 and is totally internally reflected thereat. On the other hand, the light reaching the reflective surface 20a of the reflective element 2 acquires an angle that does not produce total internal reflection at the first main surface F1 since the reflective surface 20a is curve, and passes through the first main surface F1.

In the illumination device LD of the present embodiment explained as above, the lightguide plate LG includes a plurality of reflective elements 2 each of which faces the first main surface F1 and includes a curved reflective surface 20 having the center of curvature in the first main surface F1 side. Thus, the light spreading in the lightguide member 1 can pass through the first main surface F1 within a specific angle range.

Furthermore, the reflective element 2 includes a low-reflectivity layer 21 covering the high-reflectivity layer 20. Thus, the reflection of light incoming from the second main surface F2 side by the high-reflectivity layer 20 can be prevented. By preventing such reflection, glaring in display when viewing the lightguide plate LG from the second main surface F2 side can be suppressed. For example, if the illumination device LD is used as a frontlight of a display device as explained later in the fifth embodiment, the visibility of the image on the display device will be improved by such glaring suppression.

Furthermore, since the barycenter C1 of the reflective element 2 and the barycenter C2 of projecting pattern PT1 are shifted in the X-Y plane, the reflective element 2 can apply anisotropy to the angle of light passing outside through the first main surface F1. Specifically, as shown in FIG. 3, the barycenter C1 is positioned to be more distant from the light source LS than is the baricenter C2. In this case, the light from the light source LS is reflected by the reflective element 2 and mostly passes outside through the first main surface F1 inclining toward the light source LS side as passages depicted in dotted lines in FIG. 2. That is, in the present embodiment, the light passing through the first main surface F1 can possess the anisotropy mostly inclining to the light source LS side. The illumination device LD as above can be used in various uses where emission light needs to possess anisotropy.

The intensity of the light from the light source LS decreasing toward the second end E2. However, since the density of the reflective elements 2 are increased toward the second end E2, the luminosity of the light passing outside through the first main surface F1 can be uniformed.

Furthermore, with the dummy reflective elements 3 arranged as above, the luminosity of the light passing through the lightguide plate LG from the first main surface F1 to the second main surface F2 can be substantially uniformed in the X-Y plane. The function of the dummy reflective elements 3 is effective in a case where the illumination device LD is used as a frontlight of the display device as explained later in the fifth embodiment.

Furthermore, through the manufacturing method of the lightguide plate LG of the present embodiment, the lightguide plate LG including the reflective elements 2 inside thereof and the illumination device LD including the lightguide plate LG can easily be manufactured.

Along with the above advantages, various other advantages can be achieved by the present embodiment.

Second Embodiment

Now, the second embodiment will be explained. In the present embodiment, another structure applicable to a lightguide plate and an illumination device will be explained. The following explanation will be focused on technical differences from the first embodiment, and the same or similar elements as in the first embodiment will be referred to by the same reference numbers and description considered redundant will be omitted.

Figure 10:
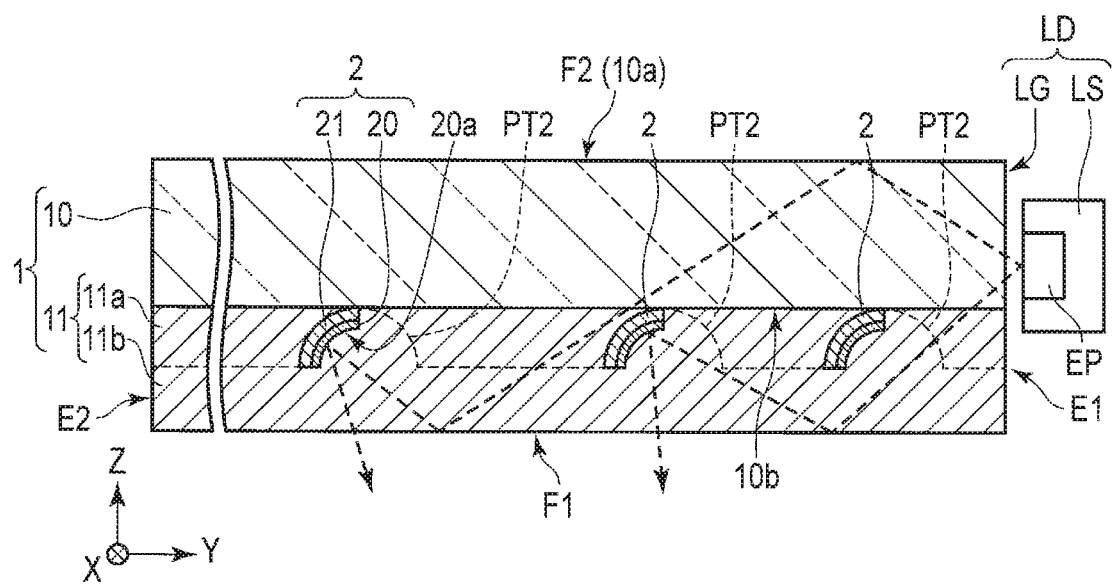
FIG. 10 is a schematic cross-sectional view which shows an illumination device of a second embodiment.

FIG. 10 shows an illumination device LD of the present embodiment and is a schematic cross-sectional view of the illumination device LD in the Y-Z plane. The illumination device LD in the figure includes a lightguide plate LG which includes, as in the first embodiment, a lightguide member 1 including a transparent base material 10 and an overcoat layer 11, and reflective elements 2. The overcoat layer 11 includes a first overcoat layer 11a and a second overcoat layer 11b. The structure of the reflective element 2 is similar to that of the first embodiment.

The first overcoat layer 11a is formed on the second main surface 10b of the transparent base material 10. The first overcoat layer 11a includes a plurality of concave patterns PT2. The concave pattern PT2 is half spherical or partial spherical. Along the inner surface of the concave pattern PT2, the reflective elements 2 are disposed inside the overcoat layer 11. Similarly to the relationship between the reflective elements 2 and projecting pattern PT1 of the first embodiment, the barycenter of the reflective element 2 and the barycenter of the concave pattern PT2 are shifted in the X-Y plane. The barycenter of the reflective element 2 is more distant from the light source LS than is the concave pattern PT2 (to be farther left of the figure).

The second overcoat layer 11b covers the reflective elements 2, concave patterns PT2 uncovered by the reflective elements 2, and first overcoat layer 11a. The second overcoat layer 11b fills in each concave pattern PT2. The first overcoat layer 11a and the second overcoat layer 11b can be formed such that their refractive indices become substantially the same, that is, they may be formed of the same material. Thus, in the boundary between the first overcoat layer 11a and the second overcoat layer 11b, light going from the first overcoat layer 11a to the second overcoat layer 11b and light going oppositely hardly make refraction or reflection. Thus, no adversely optical effect occurs. If the first overcoat layer 11a and the second overcoat layer 11b are formed of the same material, they are substantially integral and the boundary therebetween is almost invisible.

In the example of FIG. 10, the first main surface F1 of the lightguide member 1 corresponds to the outer surface of the second overcoat layer 11b (the surface not contacting the first overcoat layer 11a), and the second main surface F2 of the lightguide member 1 corresponds to the first main surface 10a of the transparent base material 10.

As depicted by dotted lines in FIG. 10, light from a light emitter EP of the light source LS enters the lightguide member 1 through the first end E1 and spreads toward the second end E2 therein while being totally internally reflected at the first main surface F1 and the second main surface F2. Part of the light is reflected by the high-reflectivity layer 20 of the reflective element 2 (reflective surface 20a) and reaches the first main surface F1. There, the light acquires an angle that does not produce total internal reflection, and passes through the first main surface F1.

Figure 11:
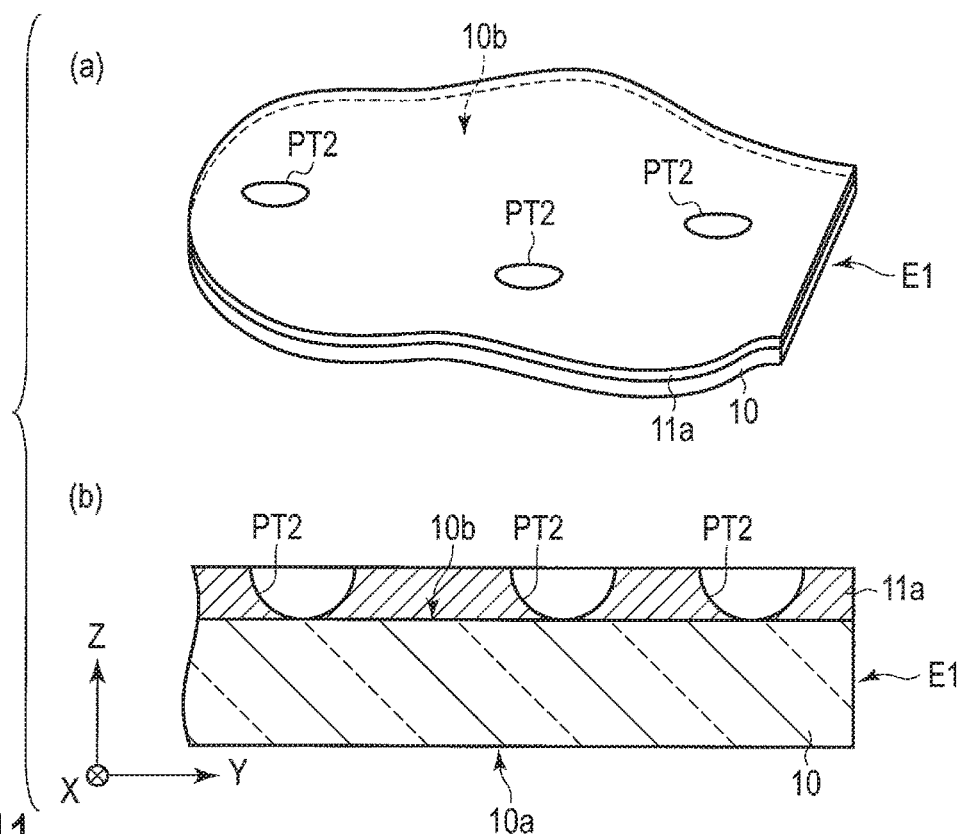
FIG. 11 shows an example of a manufacturing method of a lightguide plate of a second embodiment.

An example of a manufacturing method of the lightguide plate LG of the present embodiment will be explained with reference to FIGS. 11 to 13. In each figure, item (a) is a partial perspective view of the lightguide plate LG during the manufacturing process, and item (b) is a partial cross-sectional view of the lightguide plate LG in the Y-Z plane.

Initially, as in FIGS. 11(a) and 11(b), a first overcoat layer 11a is formed on a second main surface 10b of a transparent base material 10, and a plurality of concave patterns PT2 are formed on the first overcoat layer 11a. The concave patterns PT2 may be formed by mechanically hollowing the first overcoat layer 11a, for example. Alternatively, the concave patterns PT2 may be formed by preparing a photosensitive resin material resist as the first overcoat layer 11a and removing parts corresponding to the concave patterns PT2 from the resist by a photolithography process. Here, the concave patterns PT2 after development may be heated such that they are at least partially melted to round the corners. The concave patterns PT2 can be finished to have a spherical surface as shown in FIG. 11(b). The concave patterns PT2 may be arranged regularly or randomly.

Figure 12:
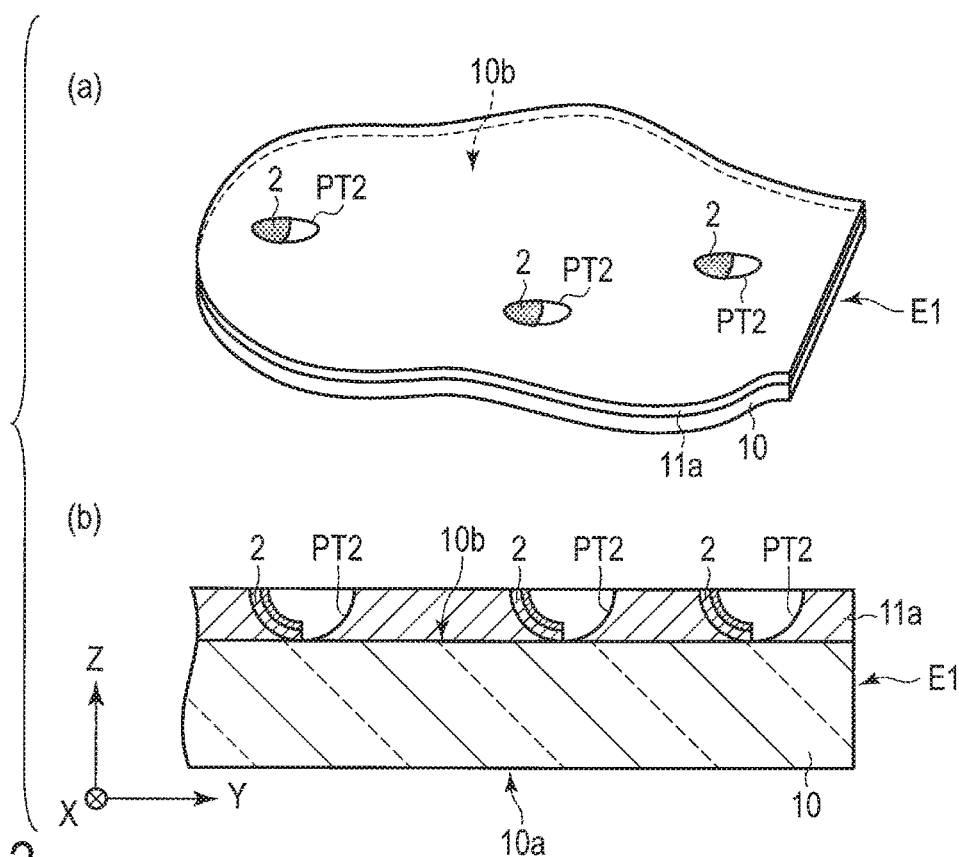
FIG. 12 shows the example of the manufacturing method of the lightguide plate of the second embodiment.

Then, as in FIGS. 12(a) and 12(b), a plurality of reflective elements 2 which at least partially cover the concave patterns PT2 are formed. In this process, for example, a high-reflectivity layer 20 and a low-reflectivity layer 21 are formed in this order on the first main surface 11a with the concave patterns PT2 formed thereon. Here, the high-reflectivity layer 20 and the low-reflectivity layer 21 are formed through an evaporation or sputtering process, and then patterned by etching to form the reflective elements 2 shown in FIGS. 12(*a*) and 12(*b*).

Figure 13:
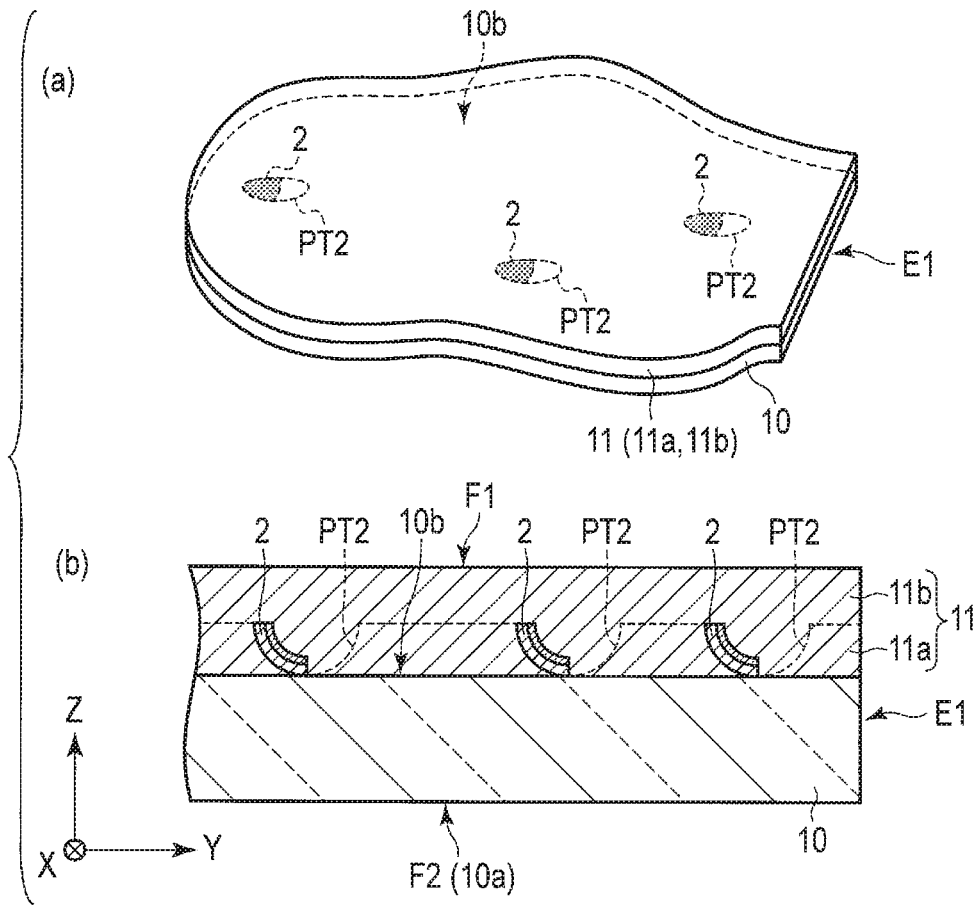
FIG. 13 shows the example of the manufacturing method of the lightguide plate of the second embodiment.

Then, as in FIGS. 13(*a*) and 13(*b*), the second overcoat layer 11*b* is formed on the first overcoat layer 11*a* to cover the reflective elements 2 and the concave patterns PT2. The lightguide plate LG is manufactured as above.

The same advantages as in the first embodiment can be achieved by the lightguide plate LG of the present embodiment.

Third Embodiment

Now, the third embodiment will be explained. In the present embodiment, another structure applicable to a lightguide plate and an illumination device will be explained. The following explanation will be focused on technical differences from the first embodiment, and the same or similar elements as in the first embodiment will be referred to by the same reference numbers and description considered redundant will be omitted.

Figure 14:
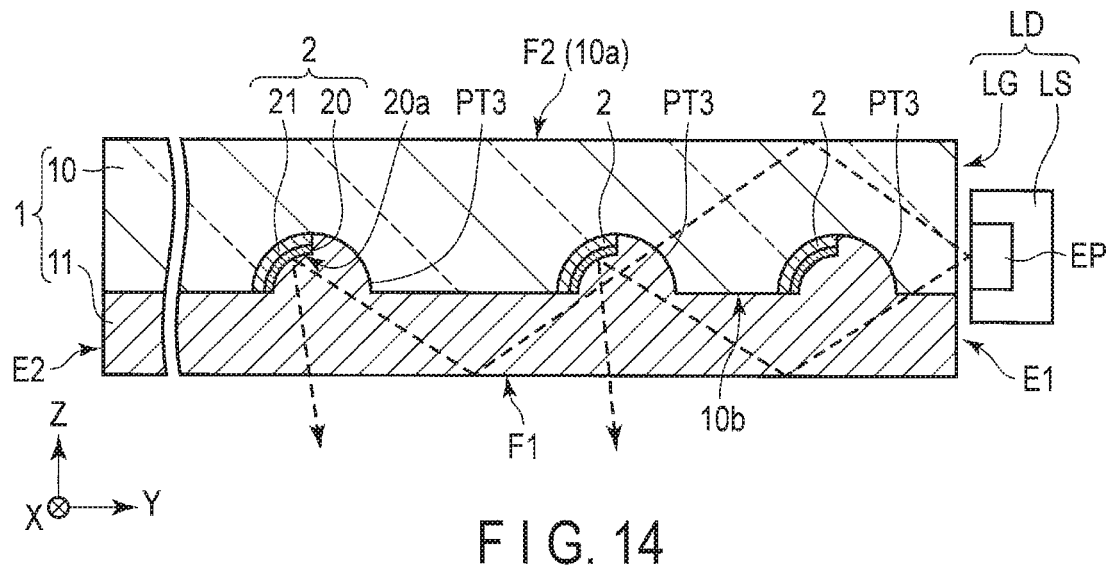
FIG. 14 is a schematic cross-sectional view of an illumination device of a third embodiment.

FIG. 14 shows an illumination device LD of the present embodiment and is a schematic cross-sectional view of the illumination device LD in the Y-Z plane. The illumination device LD in the figure includes a lightguide plate LG which includes, as in the first embodiment, a lightguide member 1 including a transparent base material 10 and an overcoat layer 11, and reflective elements 2. The structure of the reflective element 2 is similar to that of the first embodiment.

The transparent base material 10 includes a plurality of concave patterns PT3 on the second main surface 10*b*. The concave pattern PT3 is half spherical or partial spherical. Along the inner surface of the concave pattern PT3, the reflective elements 2 are disposed. Similarly to the relationship between the reflective elements 2 and projecting pattern PT1 of the first embodiment, the barycenter of the reflective element 2 and the barycenter of the concave pattern PT3 are shifted in the X-Y plane. The barycenter of the reflective element 2 is more distant from the light source LS than is the concave pattern PT3 (to be farther left of the figure).

The overcoat layer 11 covers the reflective elements 2, concave patterns PT3 uncovered by the reflective elements 2, and second main surface 10*b* of the transparent base material 10. The overcoat layer 11 fills in each concave pattern PT3.

In the example of FIG. 14, the first main surface F1 of the lightguide member 1 corresponds to the outer surface of the overcoat layer 11 (the surface not contacting the transparent base material 10), and the second main surface F2 of the lightguide member 1 corresponds to the first main surface 10*a* of the transparent base material 10.

As depicted by dotted lines in FIG. 14, light from a light emitter EP of the light source LS enters the lightguide member 1 through the first end E1 and spreads toward the second end E2 therein while being totally internally reflected at the first main surface F1 and the second main surface F2. Part of the light is reflected by the high-reflectivity layer 20 of the reflective element 2 (reflective surface 20*a*) and reaches the first main surface F1. There, the light acquires an angle that does not produce total internal reflection, and passes through the first main surface F1.

An example of a manufacturing method of the lightguide plate LG of the present embodiment will be explained with reference to FIGS. 15 to 17. In each figure, item (a) is a partial perspective view of the lightguide plate LG during the manufacturing process, and item (b) is a partial cross-sectional view of the lightguide plate LG in the Y-Z plane.

Initially, as in FIGS. 15(*a*) and 15(*b*), a plurality of concave patterns PT3 are formed on the second main surface 10*b* of the transparent base material 10. The concave patterns PT3 may be formed by mechanically hollowing the transparent base material 10, for example. Alternatively, the concave patterns PT3 may be formed by masking the second main surface 10*b* of the transparent base material 10 excluding the parts to be the concave patterns PT3 and eroding the second main surface 10*b* with, for example, a hydrofluoric acid solution. The concave patterns PT3 may be arranged regularly or randomly.

Then, as in FIGS. 16(*a*) and 16(*b*), a plurality of reflective elements 2 which at least partially cover the concave patterns PT3 are formed. In this process, for example, a high-reflectivity layer 20 and a low-reflectivity layer 21 are formed in this order on the second main surface 10*b* of the transparent base material 10 with the concave patterns PT3 formed thereon. Here, the high-reflectivity layer 20 and the low-reflectivity layer 21 are formed through an evaporation or sputtering process, and then patterned by etching to form the reflective elements 2 shown in FIGS. 16(*a*) and 16(*b*).

Figure 17:
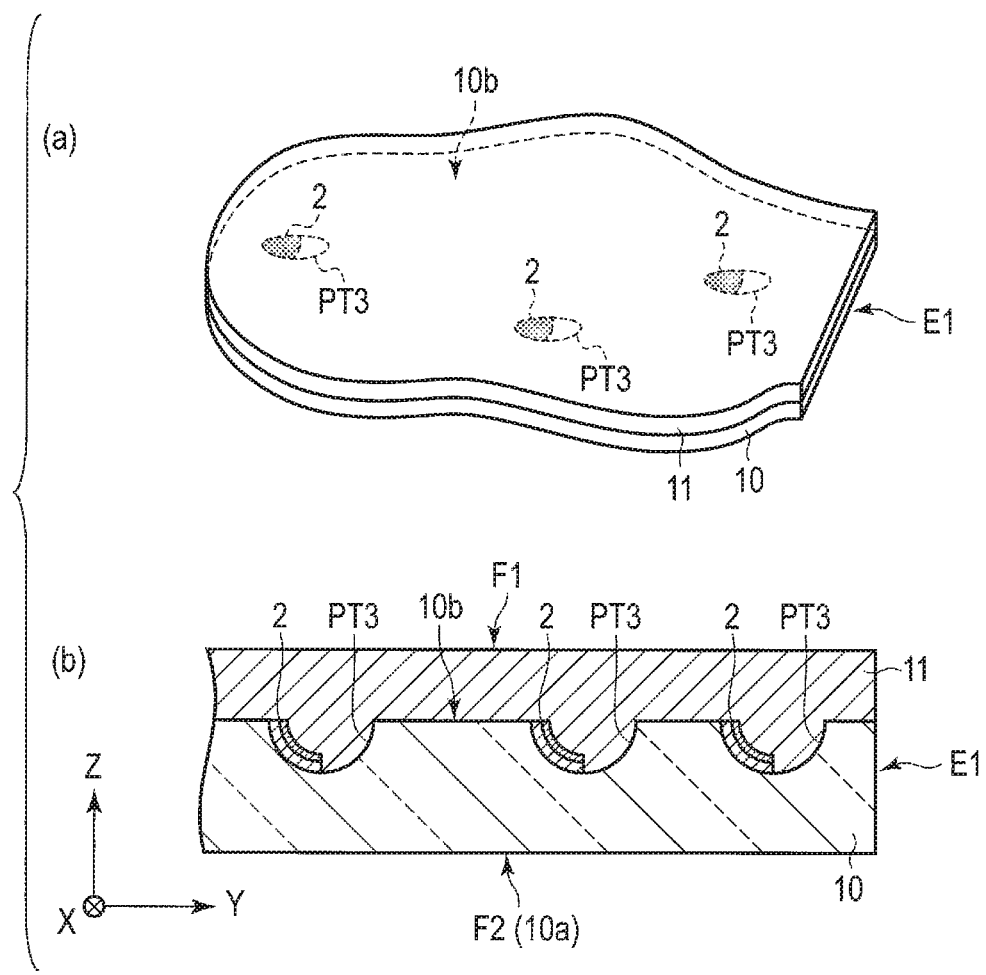
FIG. 17 shows the example of the manufacturing method of the lightguide plate of the third embodiment.

Then, as in FIGS. 17(*a*) and 17(*b*), the overcoat layer 11 is formed on the second main surface 10*b* of the transparent base material 10 to cover the reflective elements 2, the concave patterns PT3 and the second main surface 10*b*. The lightguide plate LG is manufactured as above.

The same advantages as in the first embodiment can be achieved by the lightguide plate LG of the present embodiment.

Fourth Embodiment

Now, the fourth embodiment will be explained. In the present embodiment, another structure applicable to a lightguide plate and an illumination device will be explained. The following explanation will be focused on technical differences from the first embodiment, and the same or similar elements as in the first embodiment will be referred to by the same reference numbers and description considered redundant will be omitted.

In the proximity of the light source LS, light enters the lightguide member 1 through the first end E1 partially fails to satisfy the requirement for total internal reflection, and passes outside through the second main surface F2. In this embodiment, a structure to reduce such light leakage will be presented.

Figure 18:
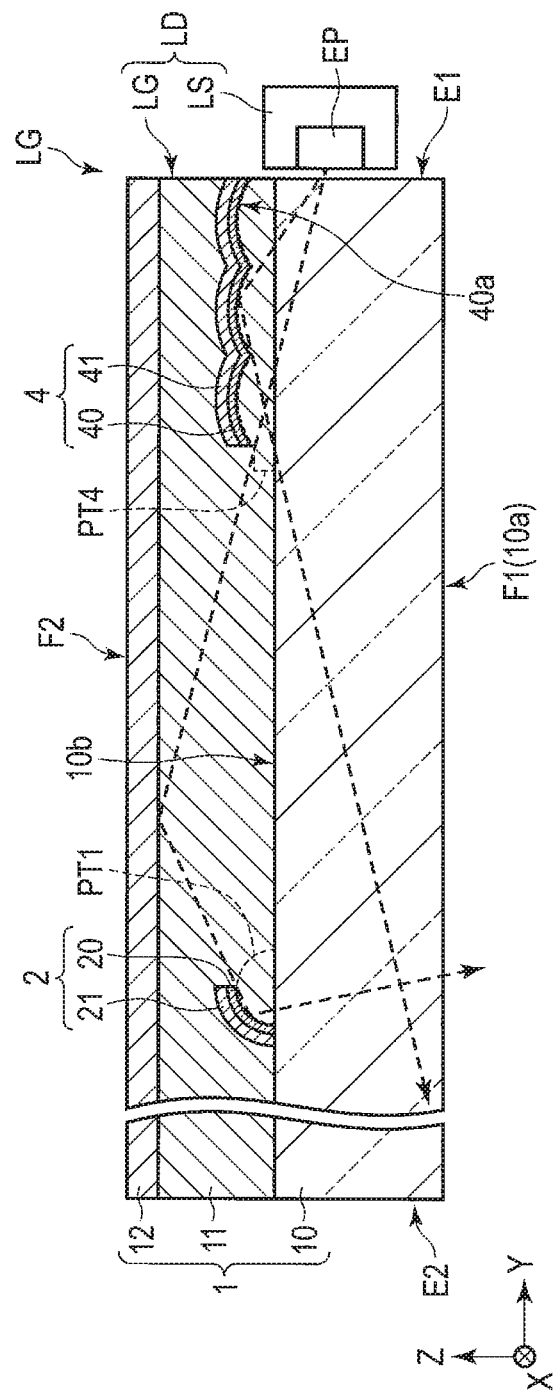
FIG. 18 is a schematic cross-sectional view of an illumination device of a fourth embodiment.

FIG. 18 shows an illumination device LD of the present embodiment and is a schematic cross-sectional view of the illumination device LD in the Y-Z plane. The illumination device LD in the figure includes a lightguide plate LG which includes, as in the first embodiment, a lightguide member 1 including a transparent base material 10 and an overcoat layer 11, and reflective elements 2. The structure of the transparent base material 10, overcoat layer 11, and reflective element 2 is similar to that of the first embodiment.

The lightguide member 1 further includes a low refractive index layer 12 covering the outer surface of the overcoat layer 11 (the surface not contacting the transparent base material 10). The low refractive index layer 12 is formed of, for example, a resin material of which refractive index is lower than that of the overcoat layer 11.

The lightguide plate LG further includes an auxiliary reflective element 4 (third reflective element) disposed inside the lightguide member 1 in the proximity of the light source LS. The auxiliary reflective element 4 is, for example, disposed to be closer to the first end E1 than is each reflective element 2 and extends in the first direction X along the first end E1. The auxiliary reflective element 4 may extend continuously from one end to the other end of the lightguide member 1 in the first direction X, or a plurality of auxiliary reflective elements 4 may be arranged separately between the ends in the first direction X.

The auxiliary reflective element 4 includes a high-reflectivity layer 40 which suitably reflects the light spreading in the lightguide member 1 and a low-reflectivity layer 41 (or light shielding layer) of which reflectivity is lower than that of the high-reflectivity layer 40. The high-reflectivity layer 40 may be formed of a metal material such as aluminum or silver. The low-reflectivity layer 41 may be formed of a metal material or a metal oxide film of which reflectivity is relatively low.

The high-reflectivity layer 40 covers a part of a projecting pattern PT4 arranged on the second main surface 10b of the transparent base material 10. The low-reflectivity layer 41 coves the surface of the high-reflectivity layer 40 in the second main surface F2 side. Projecting pattern PT4 includes a plurality of projections extending in the first direction X and arranged in the second direction Y. The cross-sectional shape of the surface of each projection is an arc of which curvature is generally lower than that of the surface of projecting pattern PT4. The surface of the high-reflectivity layer 40 in the first main surface F1 side is a reflective surface 40a of which shape is the same as that of the surface of projecting pattern PT4. The reflective surface 40a has a curvature which is generally lower than that of the reflective surface 20a of the reflective element 2 in the cross-section taken along the direction from the first end E1 to the second end E2 (cross-section in the Y-Z plane).

The overcoat layer 11 covers the reflective elements 2, projecting patterns PT1 uncovered by the reflective elements 2, the auxiliary reflective elements 4, projecting patterns PT4 uncovered by the auxiliary reflective elements 4, and the second main surface 10b of the transparent base material 10. Projecting pattern PT1, projecting pattern PT4, and overcoat layer 11 can be formed such that their refractive indices become substantially the same, that is, they may be formed of the same material. Thus, in the boundary between each projecting pattern PT1 or projecting pattern PT4 and the overcoat layer 11, light going from projecting pattern PT1 or projecting pattern PT4 to the overcoat layer 11 and light going oppositely hardly make refraction or reflection. Thus, no adversely optical effect occurs. If projecting pattern PT1, projecting pattern PT4, and overcoat layer 11 are formed of the same material, they are substantially integral and the boundary therebetween is almost invisible.

In the example of FIG. 18, the first main surface F1 of the lightguide member 1 corresponds to the first main surface 10a of the transparent base material 10, and the second main surface F2 of the lightguide member 1 corresponds to the outer surface of the low-reflective-index layer 12 (the surface not contacting the overcoat layer 11).

As depicted by dotted lines in FIG. 18, light from a light emitter EP of the light source LS enters the lightguide member 1 through the first end E1 and partly spreads toward the second end E2 therein while being reflected by the high-reflectivity layer 40 (reflective surface 40a) of the auxiliary reflective element 4. Without the auxiliary reflective element 4, the light may possibly pass outside through the second main surface F2 avoiding total internal reflection at the second main surface F2. Since the curvature of the reflective surface 40a is set suitably large, the light reflected by the reflective surface 40a does not easily acquire an angle that does not produce total internal reflection at the first main surface F1. The light spreading toward the second end E2 is partly reflected at the boundary between the overcoat layer 11 and the low-reflective-index layer 12. If the light enters the low-reflective-index layer 12, it goes to the second main surface F2 at a relatively shallow angle by the refraction at the above boundary. Thus, such light is easily totally internally reflected at the second main surface F2. The light reflected by the high-reflectivity layer 20 (reflective surface 20a) of the reflective element 2 partly acquires an angle that does not produce total internal reflection at the first main surface F1 and passes outside through the first main surface F1.

An example of a manufacturing method of a lightguide plate LG will be explained with reference to FIGS. 19 to 22. In each figure, a partial cross-sectional view of the lightguide plate LG corresponding to each manufacturing process is shown.

Figure 19:
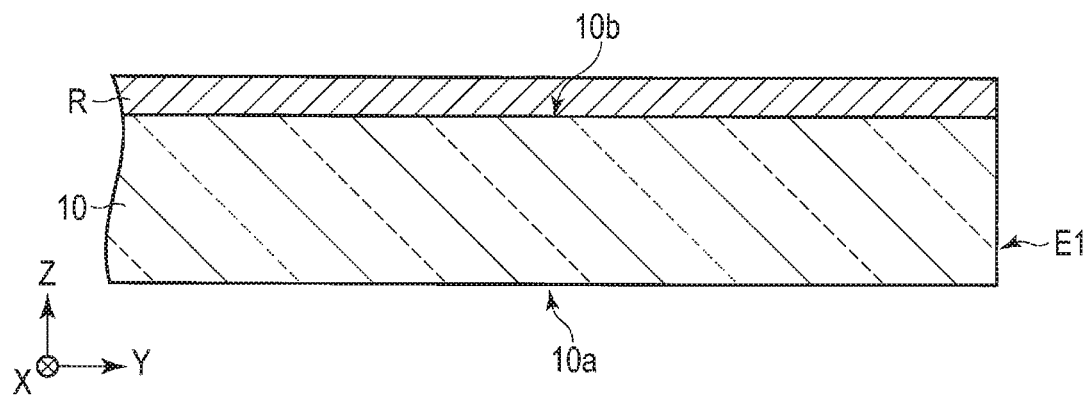
FIG. 19 shows an example of a manufacturing method of a lightguide plate of a fourth embodiment.
Figure 20:
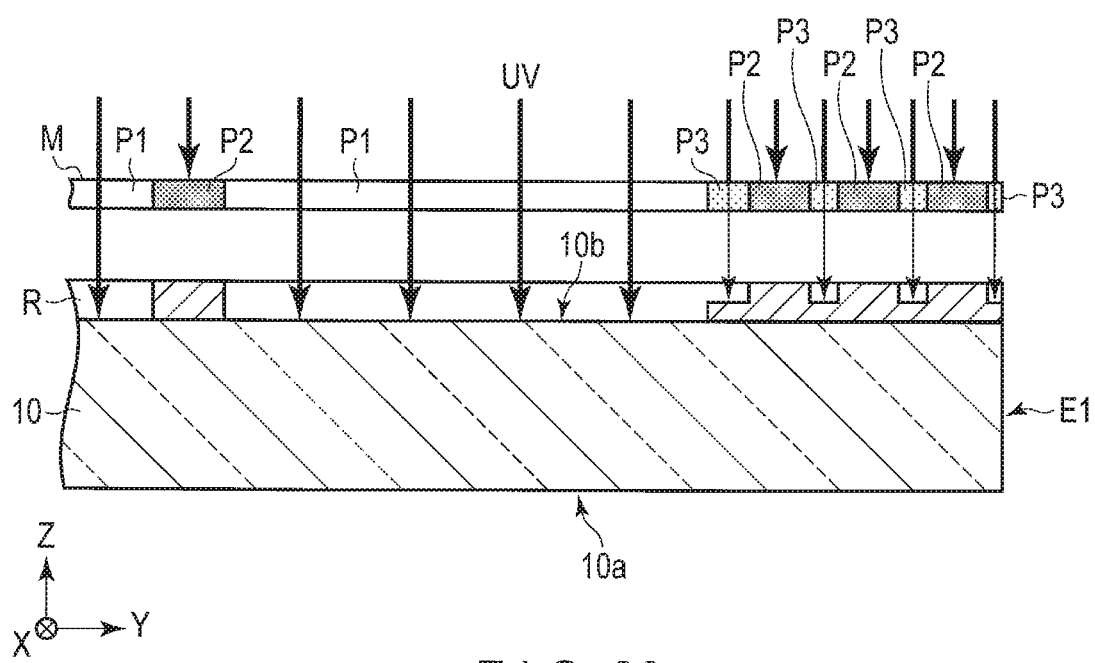
FIG. 20 shows the example of the manufacturing method of the lightguide plate of the fourth embodiment.

Initially, as shown in FIG. 19, a photosensitive resin material resist R is formed on a second main surface 10b of a transparent base material 10. Then, as shown in FIG. 20, the resist R is exposed by ultraviolet (UV) using a halftone mask M. The halftone mask M includes first parts P1 which pass substantially all of ultraviolet ray, second parts P2 which shield substantially all of ultraviolet ray, and third parts P3 which partly pass ultraviolet ray. The first parts P1 are, for example, arranged to avoid the positions of projecting patterns PT1 and PT4. The second parts P2 are, for example, arranged to correspond to the positions of projecting patterns PT1 and the position of each of the projections of projecting patterns PT4. The third parts PT3 are, for example, arranged to put second parts P2 therebetween, which correspond to each of the projections of projecting patterns PT4.

Figure 21:
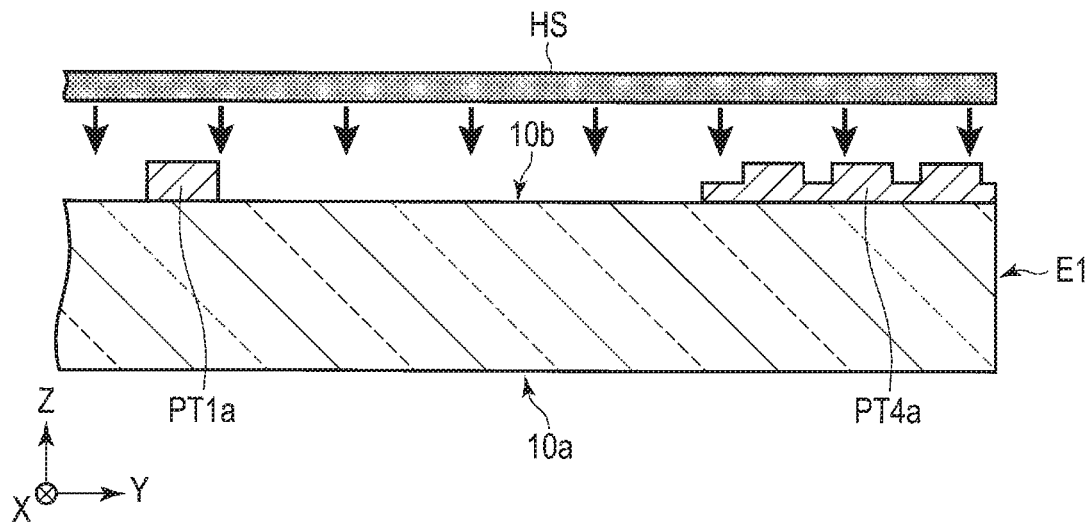
FIG. 21 shows the example of the manufacturing method of the lightguide plate of the fourth embodiment.

When the unnecessary part is removed by development of the exposed resist R, an isolation pattern PT1a which is a base of projecting pattern PT1 and a continuous pattern PT4a which is a base of projecting pattern PT4 are formed as shown in FIG. 21. The continuous pattern PT4a is formed in a concave/convex shape in which the part of the halftone mask M corresponding to the third parts PT3 is thinner than the part thereof corresponding to the second parts P2.

Figure 22:
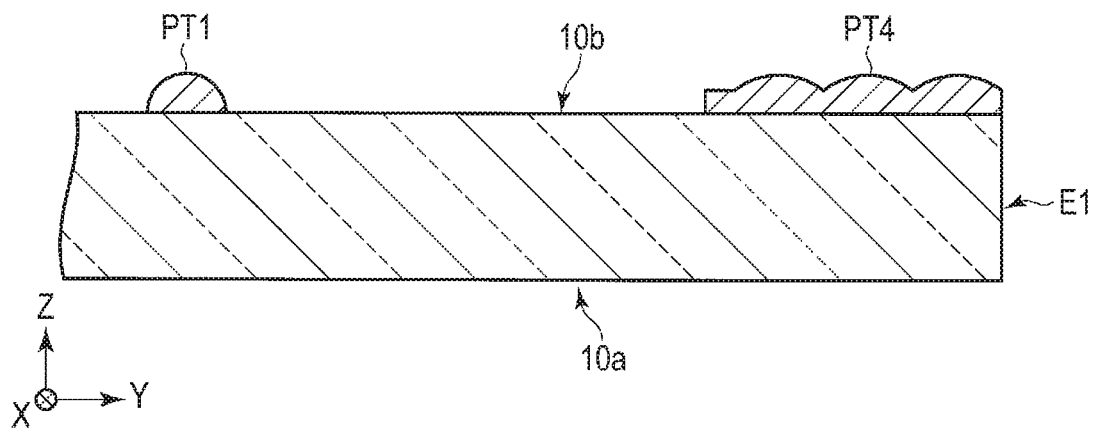
FIG. 22 shows the example of the manufacturing method of the lightguide plate of the fourth embodiment.

As shown in FIG. 21, heat from a heat source HS is applied to the patterns PT1a and PT4a for burning thereof. By burning, the patterns PT1a and PT4a are melt to round their corners, and as shown in FIG. 22, the isolation pattern PT1a becomes projecting pattern PT1 which is half spherical or partial spherical, and the continuous pattern PT4a becomes projecting pattern PT4 having a plurality of curved projections extending in the first direction X. Since the wettability of the transparent base material 10 is kept appropriately, deformation by stress becomes different between the patterns PT1a and PT4a, and furthermore, the thickness of the continuous pattern PT4a changes alternately in the thin and thick parts. Therefore, the curvature of projecting pattern PT1 increases and the curvature of each projection of projecting pattern PT4 decreases.

Then, a high-reflectivity layer 20 and a low-reflectivity layer 21 are disposed on projecting pattern PT1 to form a reflective element 2, and a high-reflectivity layer 40 and a low-reflectivity layer 41 are disposed on projecting pattern PT4 to form an auxiliary reflective element 4. The high-reflectivity layers 20 and 40 can be formed of the same material at the same time, and the low-reflectivity layers 21 and 41 are formed of the same material at the same time. Furthermore, an overcoat layer is formed to cover the reflective elements 2, auxiliary reflective element 4, projecting pattern PT1 uncovered by the reflective element 2, projecting pattern PT4 uncovered by the auxiliary reflective element 4, and second main surface 10b of the transparent base material 10, and then, a low refractive index layer 12 is formed on the overcoat layer 11. Through the above process, the lightguide plate LG is obtained.

The lightguide plate LG disclosed in the present embodiment can achieve the same advantages obtained form the first embodiment. Furthermore, with the auxiliary reflective element 4, light leakage from the second main surface F2 of the lightguide member 1 in the proximity of the light source LS can be reduced.

Fifth Embodiment

Now, the fifth embodiment will be explained. In the present embodiment, a reflective liquid crystal display device will be explained as an example of a display device including an illumination device which functions as a frontlight. The liquid crystal display device can be used in various devices such as a smartphone, tablet, mobile phone, personal computer, television receiver, in-car device, and gaming device. Note that the display device is not limited to a liquid crystal display device, and may be other display devices including a MEMS display device and an electronic paper display device.

FIG. 23 is a schematic perspective view which shows a display device DSP of the present embodiment. The display device DSP include a display panel PNL and an illumination device LD. The illumination device LD includes a lightguide plate LG and a light source LS, and is applicable to the illumination devices LD of the first to fourth embodiments.

The display panel PNL includes an array substrate AR and a countersubstrate CT. In the example of FIG. 23, both the array substrate AR and the countersubstrate CT are formed in a plate-like rectangular having short sides along the first direction X and long sides along the second direction Y. The array substrate AR and the countersubstrate CT are attached such that one short side and two long sides of each substrate match one another. The size of the array substrate AR is larger than that of the countersubstrate CT in the second direction Y, and the array substrate AR includes an interconnection area LA exposed from the countersubstrate CT. For example, interconnections and terminals used for external connection are provided with the interconnection area LA. The display panel PNL includes a display area DA on which an image is displayed.

The illumination device LD is arranged such that a first main surface F1 faces the countersubstrate CT and a first end E1 and a light source LS of the lightguide member 1 are disposed in the interconnection area LA side. For example, the light source LS and the interconnection area LA overlap in the X-Y plane. For example, the first main surface F1 overlaps the entirety of the display area DA in the X-Y plane.

As depicted by dotted lines in the figure, light from the light source LS spreads in the lightguide member 1 and partly passes outside from the first main surface F1 as being reflected by the reflective elements 2, and then, enters the display panel PNL. Using this light the display panel PNL displays an image on the display area DA. The display panel PNL may display an image by using external light passing in the lightguide member 1 from the second main surface F2 to the first main surface F1 in addition to the above light or may display an image using such external light alone.

Figure 24:
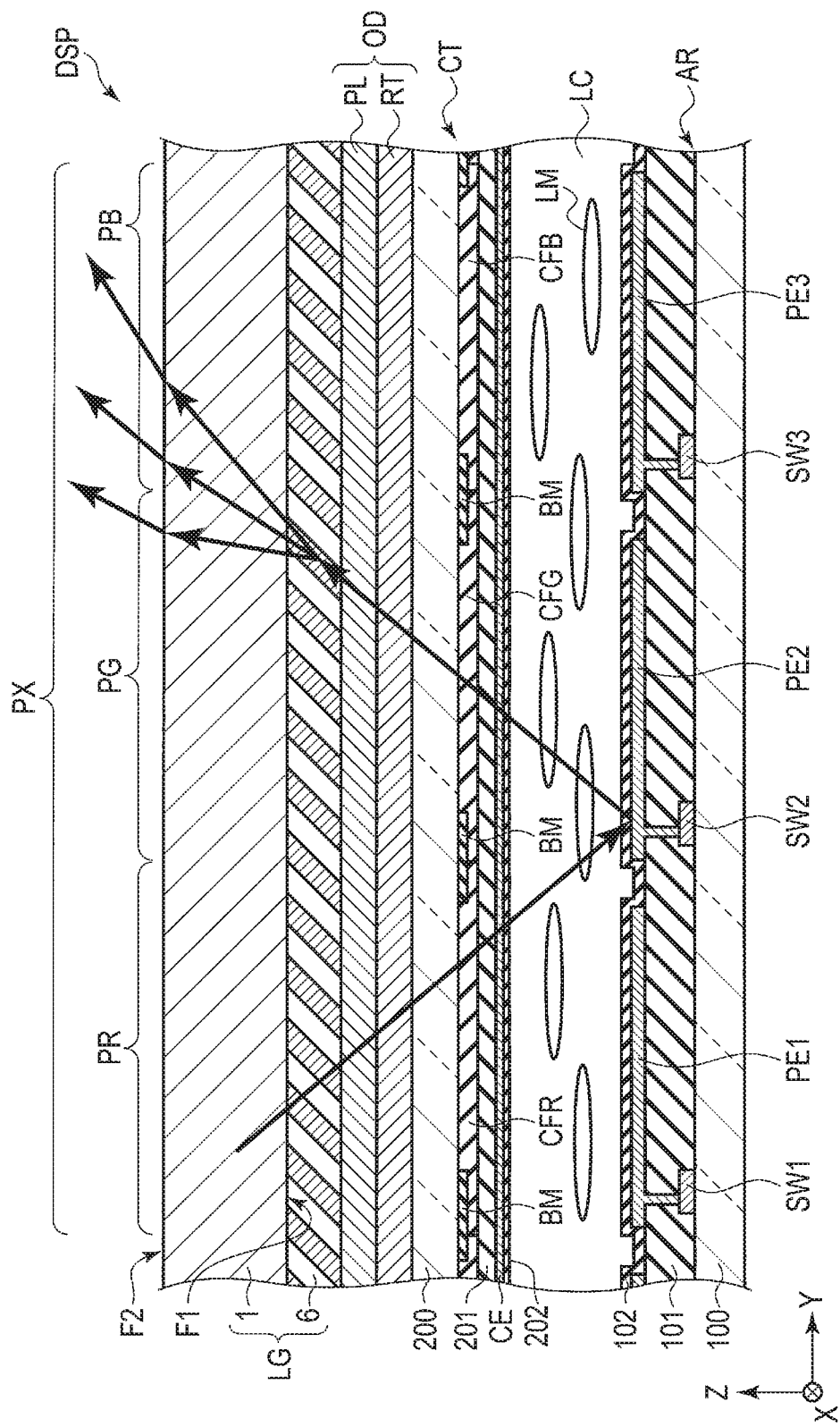
FIG. 24 is a schematic cross-sectional view of the display device of the fifth embodiment.

FIG. 24 is a schematic cross-sectional view of the display device DSP in the Y-Z plane. Here, a case where one main pixel PX includes subpixels PR, PG, and PB will be explained. The display device DSP includes an array substrate AR, countersubstrate CT, liquid crystal layer LC, and optical element OD.

The array substrate AR includes, for example, a first insulating substrate 100, switching elements SW1, SW2, and SW3, interlayer insulating film 101, pixels electrodes (reflective electrodes) PE1, PE2, and PE3, and first alignment film 102. The switching elements SW1 to SW3 are formed on the first insulating substrate 100 to be opposed to the countersubstrate CT. The switching element SW1 is disposed within the subpixel PR, the switching element SW2 is disposed within the subpixel PG, and the switching element SW3 is disposed within the subpixel PB. The interlayer insulating film 101 covers the switching elements SW1 to SW3 and first insulating substrate 100. The pixel electrodes PE1 to PE3 are formed on the interlayer insulating film 101 to be opposed to the countersubstrate CT. The pixel electrodes PE1 to PE3 each include a reflective layer formed of a light reflective metal material such as aluminum and silver. The pixel electrodes PE1 to PE3 or the reflective layers have a substantially flat surface (specular surface). The pixel electrode PE1 is disposed in the subpixel PR and is electrically connected to the switching element SW1. The pixel electrode PE2 is disposed in the subpixel PG and is electrically connected to the switching element SW2. The pixel electrode PE3 is disposed in the subpixel PB and is electrically connected to the switching element SW3. The first alignment film 102 covers the pixel electrodes PE1 to PE3 and interlayer insulating film 101.

The countersubstrate CT includes, for example, a second insulating substrate 200, light shielding layer BM, color filters CFR, CFG, and CFB, overcoat layer 201, common electrode CE, and second alignment film 202. The light shielding layer BM is formed on the second insulating substrate 200 to be opposed to the array substrate AR. The color filters CFR, CFG, and CFB are formed on the second insulating substrate to be opposed to the array substrate AR, and partly overlap the light shielding layer BM. The color filter CFR is a red color filter disposed in the subpixel PR and opposed to the pixel electrode PE1. The color filter CFG is a green color filter disposed in the subpixel PG and opposed to the pixel electrode PE2. The color filter CFB is a blue color filter disposed in the subpixel PB and opposed to the pixel electrode PE3. Note that, if the main pixel PX includes an additional subpixel of a different color, a color filter corresponding to the different color is disposed in the additional subpixel. As such a color filter different from red, green, and blue, a color filter of yellow, pale blue, or pale red may be adopted, or a substantially transparent or white color filter may be adopted. The color filters CF are arranged to correspond to the subpixels of their respective colors. The overcoat layer 201 covers the color filters CF. The common electrode CE is formed on the overcoat layer 201 to be opposed to the array substrate AR. The common electrode CE is, for example, formed on the entirety of the main pixel PX to be opposed to the pixel electrodes PE1 to PE3. Alternatively, a plurality of band-like common electrodes CE may be arranged in the first direction X or in the second direction Y. The common electrode CE is formed of a transparent conductive material such as indium tin oxide (ITO) or indium zinc oxide (IZO). The second alignment film 202 covers the common electrode CE.

The array substrate AR and the countersubstrate CT are attached such that the first alignment film 102 and the second alignment film 202 are opposed to each other. The liquid crystal layer LC includes liquid crystal molecules LM and is held between the first alignment film 102 and the second alignment film 202.

The optical element OD is disposed on a surface of the countersubstrate CT which does not contact the liquid crystal layer LC. The optical element OD includes, for example, a retardation plate RT and a polarizer PL. The retardation plate RT is, for example, adhered to the second insulating substrate 200. For example, the retardation plate RT is composed of a one-fourth wavelength plate and a half wavelength plate layered one another, and the retardation plate RT reduces wavelength dependency and achieves desired phase difference within the wavelength range used for the color display. The polarizer PL is layered on the retardation plate RT.

The lightguide plate LG further includes an anisotropy scattering layer 6 having scattering anisotropy corresponding to incident angles of light. The anisotropy scattering layer 6 is, for example, adhered to the first main surface F1 of the lightguide member 1. The anisotropy scattering layer 6 passes the light incident from specific directions while diffusing the light incident from other specific directions.

As depicted by solid lines in the figure, light of the specific direction passing through the first main surface F1 of the lightguide member 1 or external light of the specific direction passing through the lightguide member 1 is not diffused and passes through the anisotropy scattering layer 6 to enter the display panel PNL. The light is reflected by the pixel electrode PE1 to PE3, again reaches the anisotropy scattering layer 6 and diffused thereby, and passes through the lightguide member 1. The light passing through the lightguide member 1 is recognized as an image. The anisotropy scattering layer 6 is arranged between the polarizer PL and the countersubstrate CT.

For example, a user of the display device DSP sees the display area DA while keeping the interconnection area LA side of the display as shown in FIG. 23 closer to himself/herself. In such a state, the visibility of the displayed image can be improved by setting the distribution of angle of inclination of the reflective elements 2 to the above mentioned ranges, that is, between 10 and 50°, preferably 30 and 45°, and more preferably 37 and 43° to suit the angle of light passing through the first main surface F1 and the angle of light reflected by the pixel electrodes PE1 to PE3 for the anisotropy scattering layer 6.

Furthermore, as explained with reference to FIG. 9, with dummy reflective elements 3, the luminosity of the light passing through the lightguide member 1 is substantially uniformed on the X-Y plane by pixel electrodes PE1, PE2, and PE3, and a good display image without unevenness can be achieved.

The same advantages obtained by the other embodiments can be achieved by the present embodiment.

Sixth Embodiment

Now, the sixth embodiment will be explained. In the present embodiment, an example of a display device including an illumination device as a frontlight and having a function as a touch sensor (touch panel, or touch screen).

FIG. 25 is a schematic perspective view which shows a display device DSP of the present embodiment. The display device DSP includes a display panel PNL and an illumination device LD. The display device DSP is, for example, a liquid crystal display device, and the display panel PNL therein has a structure similar to that of the fifth embodiment. The illumination device LD includes a lightguide plate LG and a light source LS, and may be of any example of the first to fourth embodiments.

The display device DSP includes a drive electrode TX and a detection electrode RX. The drive electrode TX and the detection electrode RX are opposed to each other. The drive electrode TX and the detection electrode RX compose a capacitance touch sensor which can detect an object contacting or approaching the display device DSP on the basis of a change in detection signals obtained from the detection electrode RX when supplying drive signals to the drive electrode TX.

In the example of FIG. 25, a plurality of drive electrodes TX are provided with the display panel PNL, and they extend in the second direction Y and are arranged in the first direction X in the display area DA. Each drive electrode TX is formed of a transparent conductive material such as ITO or IZO. The drive electrodes TX may be disposed on a main surface of the display panel opposed to the illumination device LD, or may be disposed inside the display panel PNL. In the latter case, the common electrode CE shown in FIG. 24 may be used as the drive electrodes TX. Or, the drive electrodes TX may be formed on the first main surface F1 of the illumination device LD. In that case, the drive electrodes TX may still be formed in a band-like shape extending in the second direction Y and arranged in the first direction X to cross the detection electrode RX.

On the other hand, in the example of FIG. 25, a plurality of detection electrodes RX are provided with the lightguide plate LG, and they extend in the first direction X and are arranged in the second direction Y in an area opposed to the display area DA. Each detection electrode RX may be formed of a transparent conductive material such as ITO or IZO. Alternatively, each detection electrode RX may be a metal fine line. In that case, an arrangement pattern of detection electrodes RX may include one or more waveform detection lines or may include mesh-like detection lines. Electrically floating dummy detection lines may be provided between detection electrodes RX to uniform the distribution density of the detection lines within the display area DA. The metal fine lines may possibly block light, and by setting the distribution density of the detection lines uniform, the optical affection of the light to the image displayed on the display area DA can be reduced.

The detection electrodes RX may be disposed on the second main surface F2 of the lightguide member 1, or may be disposed inside the lightguide member 1. In the latter case, the detection electrodes RX may be disposed in the same layer where the reflective elements 2 are disposed such that the detection electrodes RX and the reflective elements 2 are manufactured in the same manufacturing process.

Figure 26:
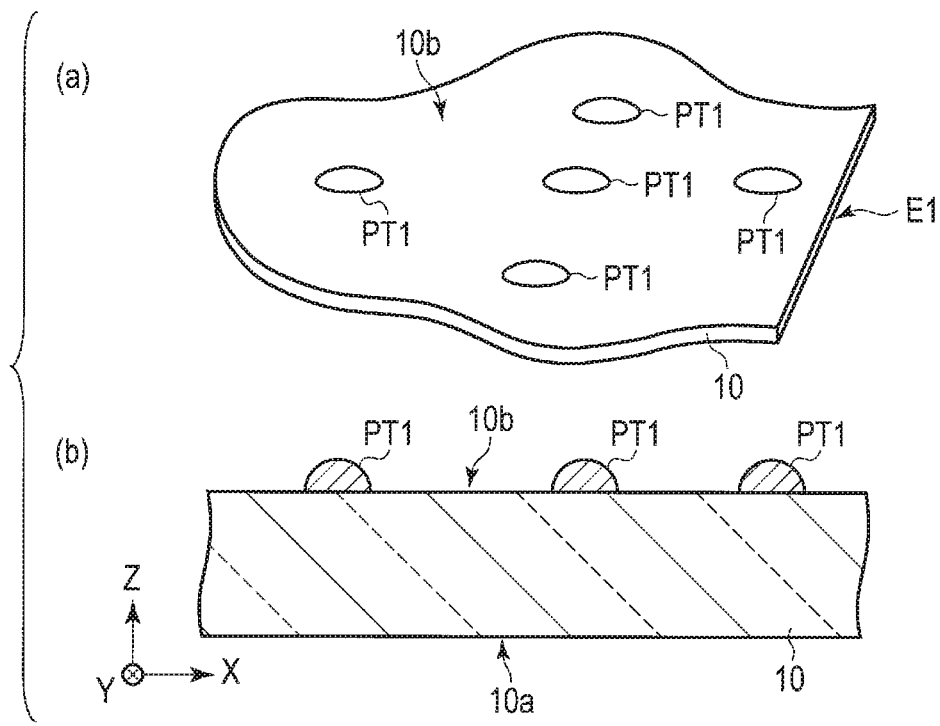
FIG. 26 shows an example of a manufacturing method of a lightguide plate of a sixth embodiment.

An example of this manufacturing process will be explained with reference to FIGS. 26 to 28. Here, a case where the lightguide plate LG is structured as in the first embodiment except for the detection electrodes RX will be given. In each figure, item (a) is a partial perspective view of the lightguide plate LG during the manufacturing process, and item (b) is a partial cross-sectional view of the lightguide plate LG in the Y-Z plane.

Initially, as shown in FIGS. 26(a) and 26(b), a plurality of projecting patterns PT1 are formed on a second main surface 10b of a transparent base material 10.

Then, as in FIG. 27(a), a detection line 7 is formed on the second main surface 10b of the transparent base material 10. In the example of FIG. 27(a), the detection line 7 extends substantially parallel with the first end E1, and overlaps a part of projecting patterns PT1 on the second main surface 10b. In this process, the detection line 7 and the reflective elements 2 with respect to projecting patterns PT1 not overlapping the detection line 7 are formed at the same time. The diameter of projecting pattern PT1 is made greater than the width of the detection line 7 to increase a margin in the overlapping part. Thus, the accuracy requirements in the manufacturing process can be eased. The detection line 7 partly covers projecting patterns PT1, for example. In the example depicted, the detection line 7 is formed such that projecting patterns PT1 can be exposed in the first end E1 side. The reflective elements 2 may not be formed on projecting patterns PT1 not overlapping the detection line 7. If a dummy detection line is formed as mentioned above, such a detection line may be formed to overlap projecting patterns PT1.

As in FIG. 27(b), the detection line 7 includes a high-reflectivity layer 70 and a low-reflectivity layer 71. If a foundation film for the high-reflectivity layers 20 and 70 and a foundation film for the low-reflectivity layers 21 and 71 are formed in this order, the reflective elements 2 and the detection line 7 can be formed at the same time by patterning the foundation films into the shape of the reflective elements 2 and the detection line 7. If the high-reflectivity layers 20 and 70 are formed of aluminum or silver, good reflectivity and good touch operation detectability can be achieved.

After the formation of the reflective elements 2 and the detection line 7, as in FIGS. 28(a) and 28(b), an overcoat layer 11 is formed on the second main surface 10 of the transparent base material 10 to cover the reflective elements 2, detection lines 7, and projecting patterns PT1. The lightguide plate LG is achieved as above.

The above manufacturing process has been explained with the lightguide plate LG structured as in the first embodiment. However, the reflective elements 2 and the detection line 7 can be manufactured through the same manufacturing process in the same layer even if the lightguide plate LG is structured as in any of the second to fourth embodiments.

By forming the detection line 7 to expose projecting patterns PT1 in the first end E1 side, the part of the detection line 7 overlapping projecting patterns PT1 can function as the reflective elements 2 such that the light reflected by the high-reflectivity layer 70 of the detection line 7 and passing through the first main surface F1 can have anisotropy.

Note that the function of the touch sensor may be applied to the display device DSP by a different method from the method used in the present embodiment. For example, both drive electrodes TX and detection electrodes RX may be disposed in the display panel PNL. In that case, the detection electrodes RX may be disposed on the outer surface of the countersubstrate CT (the surface opposed to the illumination device LD) and a common electrode CE may be used as the drive electrodes TX. Or, drive electrodes TX and detection electrodes RX may be arranged alternately on the same plane. Or, drive electrodes TX may be disposed on a main surface of a substrate which is provided separately from a display panel PNL and an illumination device LD, and detection electrodes RX may be disposed on the other main surface, and the substrate may be disposed on the lightguide member 1 in the second main surface F2 side or may be interposed between the first main surface F1 and the display panel PNL.

Figure 27:
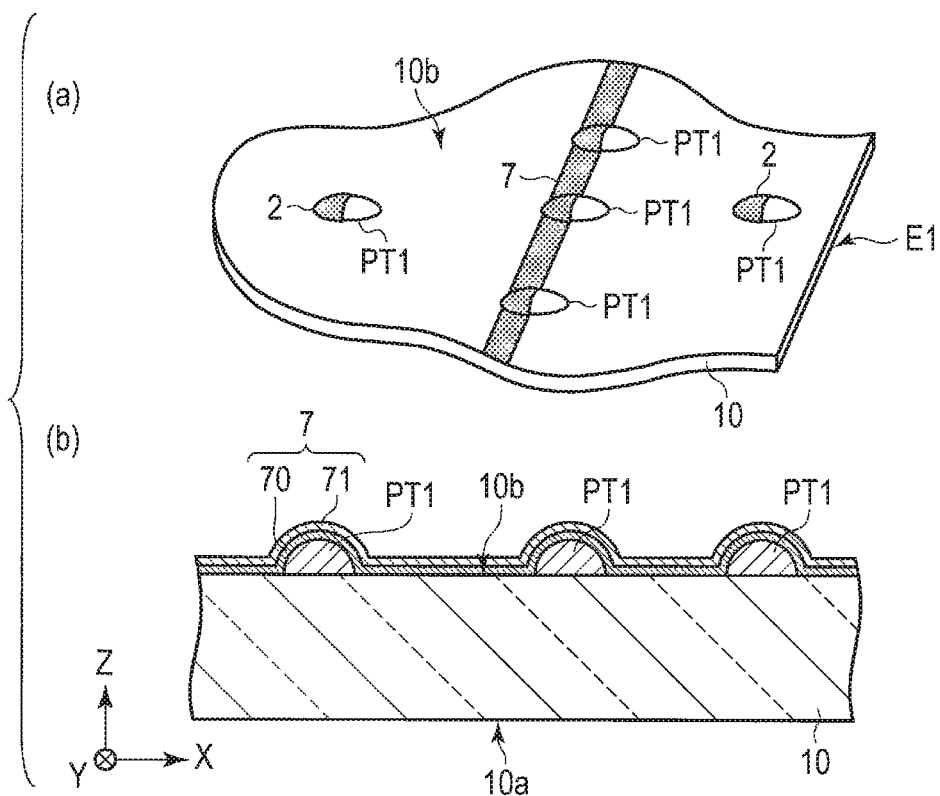
FIG. 27 shows the example of the manufacturing method of the lightguide plate of the sixth embodiment.
Figure 28:
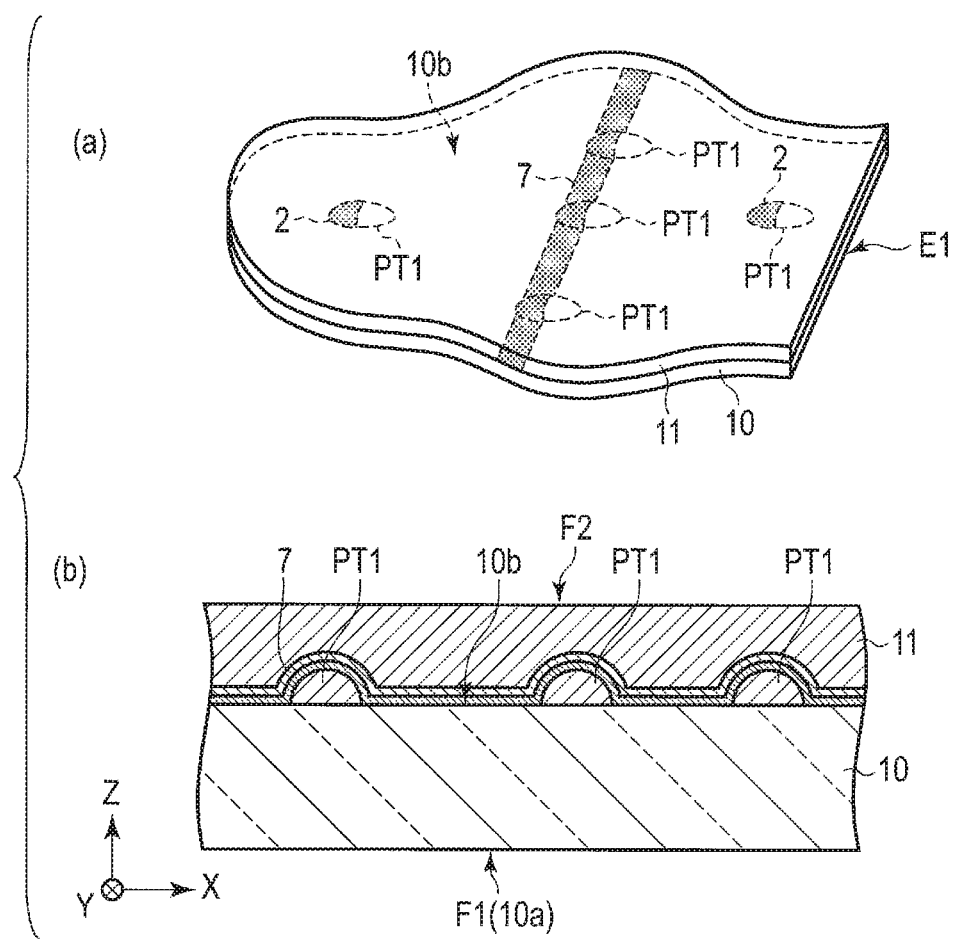
FIG. 28 shows the example of the manufacturing method of the lightguide plate of the sixth embodiment.

In the FIGS. 27 and 28, the detection line 7 overlaps a part of projecting pattern PT1 such that the overlapping part of the detection line 7 functions as a reflective element 2. However, the detection line 7 may be disposed to avoid projecting patterns PT1. In that case, the drive electrodes TX may extend in the first direction X and be arranged in the second direction Y, and the detection electrodes RX may extend in the second direction Y and be arranged in the first direction X.

Furthermore, in the present embodiment, a mutual capacitance detection touch sensor using both drive electrodes TX and detection electrodes RX has been described; however, the detection method of the touch sensor is not limited thereto. For example, a self capacitance detection touch sensor using detection electrodes RX alone may be adopted. In this detection method, an object contacting or approaching the display device DSP can be detected on the basis of a change in the self capacitance of the detection electrodes RX.

Several embodiments have been described above which are merely examples and do not limit the scope of the invention. Above novel embodiments can be achieved in various models, and various omission, substitution, and modification of the embodiments can be performed within the spirit of the invention. Such embodiments and their variations are encompassed by the description of the invention, and abstract, and are encompassed within the scope of the claims of the present application and their equals.

For example, the structured of the above embodiments can be combined arbitrarily.

Furthermore, in each embodiment, to apply anisotropy to the light passing through the first main surface F1 of the lightguide member 1, the barycenter of the reflective element 2 and the barycenter of each pattern PT1, PT2, and PT3 is shifted on the X-Y plane. However, the barycenter of the reflective element 2 and the barycenter of each pattern PT1, PT2, and PT3 may be matched on the X-Y plane to avoid anisotropy. In that case, the center of curvature of the reflective surface 20a is positioned closer to the first main surface F1 side than if the reflective surface 20a to set the angle of light reflected by the reflective surface 20a and passing through the first main surface F1 within a specific range.

In the above embodiments, an additional element such as a cover glass may be provided with the lightguide member 1 in the second main surface F2 side. Such an element may be considered as a part of the lightguide plate LG or may be considered as a part of the illumination device LD. Or, it may be considered as a part of the display device DSP.

What is claimed is:

1. A display device comprising:
    a display panel including a display area on which an image is displayed;
    a light source;
    a lightguide member including a first end which faces the light source, a second end which is opposite to the first end, a first main surface which is between the first and second ends to be facing the display panel, and a second main surface which is opposite to the first main surface;
    a plurality of first reflective elements disposed in the lightguide member, each of the first reflective elements being oblique to the first main surface so as to reflect light from the light source through the first end to the first main surface; and
    a plurality of second reflective elements disposed in the lightguide member, each of the second reflective elements having a cross-sectional shape which is different from a cross-sectional shape of the first reflective elements, the cross-sectional shape of the second reflective element being a flat shape as a whole and parallel to the first main surface, an outer shape of the second reflective elements and an outer shape of the first reflective elements, both of which are orthographic projections of the first main surface, being the same shape, wherein
the first reflective elements are arranged such that the number thereof per unit area increases from the first end to the second end,
the second reflective elements are arranged such that the number thereof per unit area decreases from the first end to the second end, and
an angle formed between the first main surface and a bottom surface of the first reflective elements in a cross-sectional view is different from an angle formed between the first main surface and a bottom surface of the second reflective element in the cross-sectional view.

2. The display device of claim 1, wherein an arrangement density of reflective elements including the first reflective elements and the second reflective elements is substantially uniform between the first end and the second end.

3. The display device of claim 1, wherein each of the first reflective elements is arranged to be apart from the first main surface or the second main surface with a certain distance in a thickness direction of the lightguide member.

4. The display device of claim 3, wherein a distance between the second reflective element and the first main surface is the same as a minimum distance between the first reflective element and the first main surface.

5. The display device of claim 1, wherein each of the first reflective elements has a first reflective surface which faces the first main surface.

6. The display device of claim 1, wherein each of the first reflective elements has a curved reflective surface which faces the first main surface and projects toward the second main surface.

7. The display device of claim 1, wherein a respective one of the plurality of first reflective elements includes a first high-reflectivity layer having a first reflective surface and a first low-reflectivity layer covering the first high-reflectivity layer from the opposite side of the first reflective surface.

8. The display device of claim 7, wherein a respective one of the plurality of second reflective elements includes a second high-reflectivity layer having a second reflective surface, and a second low-reflectivity layer covering the second high-reflectivity layer from the opposite side of the second reflective surface.

9. The display device of claim 1, wherein the lightguide member includes a base material having the first main surface, and an overcoat layer having the second main surface and covering one surface of the base material, and
the first and second reflective elements are disposed inside the overcoat layer.

10. The display device of claim 7, wherein the first reflective surface forms an angle with the first main surface in a cross-section along a direction from the first end to the second end such that distribution of the angle has a peak between 10 and 50 degrees.

11. An illumination device comprising:
a light source;
a lightguide member including a first end which faces the light source, a second end which is opposite to the first end, a first main surface which is between the first and second ends, and a second main surface which is opposite to the first main surface;
a plurality of first reflective elements disposed in the lightguide member, each of the first reflective elements being oblique to the first main surface so as to reflect light from the light source through the first end to the first main surface; and
a plurality of second reflective elements disposed in the lightguide member, each of the second reflective elements having a cross-sectional shape which is different from a cross-sectional shape of the first reflective elements, the cross-sectional shape of the second reflective element being a flat shape as a whole and parallel to the first main surface, an outer shape of the second reflective elements and an outer shape of the first reflective elements, both of which are orthographic projections of the first main surface, being the same shape, wherein
the first reflective elements are arranged such that the number thereof per unit area increases from the first end to the second end,
the second reflective elements are arranged such that the number thereof per unit area decreases from the first end to the second end, and
an angle formed between the first main surface and a bottom surface of the first reflective elements in a cross-sectional view is different from an angle formed between the first main surface and a bottom surface of the second reflective element in the cross-sectional view.

12. The illumination device of claim 11, wherein an arrangement density of reflective elements including the first reflective elements and the second reflective elements is substantially uniform between the first end and the second end.

13. The illumination device of claim 11, wherein each of the first reflective elements is arranged to be apart from the first main surface or the second main surface with a certain distance in a thickness direction of the lightguide member.

14. The illumination device of claim 13, wherein a distance between the second reflective element and the first main surface is the same as a minimum distance between the first reflective element and the first main surface.

15. The illumination device of claim 11, wherein each of the first reflective elements has a first reflective surface which faces the first main surface.

16. The illumination device of claim 11, wherein each of the first reflective elements has a curved reflective surface which faces the first main surface and projects toward the second main surface.

17. The illumination device of claim 11, wherein a respective one of the plurality of first reflective elements includes a first high-reflectivity layer having a first reflective surface and a first low-reflectivity layer covering the first high-reflectivity layer from the opposite side of the first reflective surface.

18. The illumination device of claim 17, wherein a respective one of the plurality of second reflective elements includes a second high-reflectivity layer having a second reflective surface, and a second low-reflectivity layer covering the second high-reflectivity layer from the opposite side of the second reflective surface.

19. The illumination device of claim 11, wherein the lightguide member includes a base material having the first main surface, and an overcoat layer having the second main surface and covering one surface of the base material, and
the first and second reflective elements are disposed inside the overcoat layer.

20. The illumination device of claim 17, wherein the first reflective surface forms an angle with the first main surface in a cross-section along a direction from the first end to the second end such that distribution of the angle has a peak between 10 and 50 degrees.

* * * * *